US012525236B2

(12) United States Patent
Chen et al.

(10) Patent No.: US 12,525,236 B2
(45) Date of Patent: Jan. 13, 2026

(54) CONTROL DISPLAY METHOD AND DEVICE

(71) Applicant: HUAWEI TECHNOLOGIES CO., LTD., Shenzhen (CN)

(72) Inventors: Hao Chen, Shenzhen (CN); Zhang Gao, Shanghai (CN); Xiaoxiao Chen, Nanjing (CN); Shiyi Xiong, Wuhan (CN); Zhihua Yin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 18/006,703

(22) PCT Filed: Jul. 15, 2021

(86) PCT No.: PCT/CN2021/106385
§ 371 (c)(1),
(2) Date: Jan. 24, 2023

(87) PCT Pub. No.: WO2022/022289
PCT Pub. Date: Feb. 3, 2022

(65) Prior Publication Data
US 2023/0317071 A1    Oct. 5, 2023

(30) Foreign Application Priority Data
Jul. 28, 2020    (CN) .......................... 202010736457.4

(51) Int. Cl.
*G06F 3/048*    (2013.01)
*G06F 3/04817*    (2022.01)
*G10L 15/22*    (2006.01)

(52) U.S. Cl.
CPC .......... *G10L 15/22* (2013.01); *G06F 3/04817* (2013.01); *G10L 2015/223* (2013.01)

(58) Field of Classification Search
USPC ...................... 345/581–689, 9–90, 901–902; 704/1–275; 706/1–62; 715/700–866
See application file for complete search history.

(56) References Cited

U.S. PATENT DOCUMENTS 10,791,231 B2 * 9/2020 Kurumasa ............ G06K 15/005
10,896,050 B2 * 1/2021 Wang ................ H04M 1/72403
(Continued)

FOREIGN PATENT DOCUMENTS

CN    109584879 A    4/2019

OTHER PUBLICATIONS

"Get Rid of Fast Forward Notfication in 1.7.7 Stable Release," The Wayback Machine, XP093106116, Total 1 page (May 7, 2019).

*Primary Examiner* — Marcellus J Augustin
(74) *Attorney, Agent, or Firm* — Leydig, Voit & Mayer, Ltd.

(57) ABSTRACT

A control display method and a device are provided. The method includes: receiving a wake-up word input by a user; displaying a second interface of a first application, wherein the second interface includes the first control and a second control; receiving a switching operation of the user; displaying a first interface of a second application, wherein the first interface of the second application includes the first control; receiving the wake-up word input again by the user; and displaying a second interface of the second application, wherein the second interface of the second application includes the first control and a third control. According to this application, voice controls associated with different applications are automatically added and displayed, thereby ensuring that a same quantity and types of voice controls are displayed on interfaces of different applications and improving a voice service function of the electronic device.

20 Claims, 11 Drawing Sheets

(56) References Cited

U.S. PATENT DOCUMENTS

| | | | |
|---|---|---|---|
| 11,868,680 B2* | 1/2024 | Lee | G06F 9/4843 |
| 2014/0258182 A1* | 9/2014 | Joung | G06F 9/454 |
| | | | 706/11 |
| 2015/0000025 A1* | 1/2015 | Clements | G06F 3/041 |
| | | | 4/443 |
| 2015/0134341 A1 | 5/2015 | Tamura et al. | |
| 2017/0358305 A1* | 12/2017 | Kudurshian | G10L 13/02 |
| 2020/0027448 A1 | 1/2020 | Aggarwal et al. | |
| 2020/0118568 A1* | 4/2020 | Kudurshian | G06F 16/9032 |

* cited by examiner

CONTROL DISPLAY METHOD AND DEVICE

CROSS-REFERENCE TO RELATED APPLICATIONS

This application is a National Stage of International Application No. PCT/CN2021/106385, filed on Jul. 15, 2021, which claims priority to Chinese Patent Application No. 202010736457.4, filed on Jul. 28, 2020, both of which are hereby incorporated by reference in their entireties.

TECHNICAL FIELD

Embodiments of this application relate to the field of voice control technologies, and in particular, to a control display method and a device.

BACKGROUND

With rapid development of forms and functions of user equipment, interaction between a user and various devices becomes frequent, and breaking boundaries between devices to enable the user to perform seamless interaction on the various devices has become a general trend of evolution towards intelligent interconnection.

For example, when the user wakes up a television (TV) by voice and delivers a voice instruction to play a video, because different application interfaces have different designs, a same voice instruction cannot have a consistent response in interfaces of different video playing applications. For example, Tencent Video supports a voice service response of "next episode". When the TV is woken up and receives a voice instruction for playing a next episode that is delivered by the user, the TV may identify and automatically perform a system event for playing a next episode, and feed back a response to the user. However, a same voice instruction of "next episode" may not be executed in another application interface. For example, a control for playing a next episode is not available in the another application interface, and therefore the user cannot obtain a feedback response, resulting in a decrease in user satisfaction.

SUMMARY

This application provides a control display method and a device, so that a same control can be displayed in different application interfaces, to improve user satisfaction. Specifically, the following technical solutions are disclosed:

According to a first aspect, this application provides a control display method, and the method may be applied to an electronic device. The electronic device includes a display, and a first interface of a first application is displayed on the display, where the first interface includes a first control. The method includes: receiving a wake-up word input by a user; displaying a second interface of the first application in response to the received wake-up word, where the second interface includes the first control and a second control; receiving a switching operation of the user; displaying a first interface of a second application on the display, where the first interface of the second application includes the first control; receiving the wake-up word input again by the user; and displaying a second interface of the second application in response to the received wake-up word, where the second interface of the second application includes the first control and a third control.

According to the method provided in this aspect, when receiving the wake-up word input by the user, the electronic device automatically adds and displays, in a current interface of the first application, the second control that is not included in the current interface. This implements automatic addition and display of the second control associated with the first application. When the first application is switched to the second application, the third control is automatically added and displayed in a current interface of the second application, so that the first control in the original first application and the third control in the second application can be displayed on the display of the electronic device when the user switches applications, and all controls associated with different applications are ensured to be displayed on the display of the electronic device. This further improves a voice service function of the electronic device and user satisfaction.

With reference to the first aspect, in a possible implementation of the first aspect, before the displaying a second interface of the first application in response to the received wake-up word, the method further includes: obtaining a first component set based on a first interface type of the first application, where the first component set includes the second control.

Optionally, the first component set further includes the third control, a fourth control, and the like.

In this implementation, a correspondence between an interface type of each application and a component set is established, where the component set includes at least one voice control, so that a voice control is automatically added based on an interface type of a current interface.

In addition, optionally, the component set is also referred to as a "virtual component set". For example, a component set displayed in the first interface of the first application is referred to as a first virtual component set, and a component set included in the first interface type of the first application is referred to as a second virtual component set.

With reference to the first aspect, in another possible implementation of the first aspect, before the displaying a second interface of the second application in response to the received wake-up word, the method further includes: obtaining a second component set based on a first interface type of the second application, where the second component set includes the third control. In this implementation, a correspondence between the first interface type of the second application and the second component set is established, where the second component set includes the third control, so that the third control is automatically added based on the current interface type.

Optionally, the second interface of the first application further includes prompt information corresponding to the second control. For example, the prompt information may be: next episode, previous episode, play/pause, episodes, or the like.

With reference to the first aspect, in still another possible implementation of the first aspect, the method further includes: displaying a third interface of the first application in response to a first voice instruction, where the third interface includes a service response that is output after an operation corresponding to the first voice instruction is performed. In this implementation, when the user delivers the first voice instruction, a control in the first application outputs a service response after being enabled and executing the first voice instruction, and displays the service response in the third interface, to provide a corresponding voice service for the user.

With reference to the first aspect, in yet another possible implementation of the first aspect, the displaying a third interface of the first application in response to a first voice instruction includes: enabling the second control, performing the operation corresponding to the first voice instruction, and displaying the service response in the third interface of the first application. Alternatively, the electronic device receives the service response sent by a server, and displays the service response in the third interface of the first application. In this implementation, after the electronic device adds the second control, a function of the second control may be implemented by invoking the server, so that a service capability of the electronic device is improved, functions of all voice controls displayed in the current interface are provided for the user, and user satisfaction is improved.

With reference to the first aspect, in still yet another possible implementation of the first aspect, the displaying a second interface of the first application includes: displaying a control icon of the second control in the second interface of the first application; or displaying a control icon of the second interface and the prompt information of the second control in the second interface of the first application. In this implementation, both the control icon of the second control and the prompt information of the second control are added and displayed in the current interface, so that the user can easily deliver a voice instruction based on the prompt information. This improves voice interaction efficiency.

With reference to the first aspect, in a further possible implementation of the first aspect, the second interface of the first application further includes a control icon of the fourth control. The fourth control is used to perform an operation corresponding to a second voice instruction. The control icon of the second control is in a first color, the control icon of the fourth control is in a second color, and the first color is different from the second color. In response to the first voice instruction, the electronic device enables the second control and performs the operation corresponding to the first voice instruction. In response to the second voice instruction, the electronic device sends an indication signal to the server. The indication signal is used to indicate the server to perform the operation corresponding to the second voice instruction.

In this implementation, the electronic device differentiates, by using different colors, a control that is supported by the electronic device to provide a voice service and a control that is not supported by the electronic device to provide a voice service. For example, an icon of the control supported by the electronic device is displayed in the first color and an icon of the control not supported by the electronic device is displayed in the second color, so that the user can make easy identification and differentiation. In addition, the second voice instruction for which the electronic device does not support providing a service response may be implemented with help of the server or another device, and then transmitted to the electronic device, so that a service capability of the electronic device is improved and a user requirement is met.

It should be understood that differentiation may alternatively be performed in another manner, for example, a mark or a pattern. This is not limited in this application.

According to a second aspect, this application further provides a control display method, applied to an electronic device. The electronic device includes a display. The method includes: receiving a wake-up word input by a user; displaying a first interface of a first application on the display in response to the received wake-up word, where the first interface includes a first control; receiving a first voice instruction input by the user; and displaying a second interface of the first application in response to the received first voice instruction, where the second interface includes the first control and a second control, and the second control is used to perform an operation corresponding to the first voice instruction.

According to the method provided in this aspect, after the electronic device is woken up by the user, the electronic device may display, in a current interface of the electronic device, a control corresponding to any voice instruction delivered by the user, to provide a corresponding service when the user delivers the voice instruction again. This avoids a case that the voice instruction delivered by the user cannot be executed in the current interface of the electronic device because controls in different application interfaces are different. In this method, automatic addition and display of the second control are implemented, so that a voice service function and user satisfaction are improved.

With reference to the first aspect, in a possible implementation of the second aspect, before the displaying a second interface of the first application in response to the received first voice instruction, the method further includes: obtaining text content corresponding to the first voice instruction, where the text content corresponds to the second control; and obtaining the second control when the first interface of the first application does not include the second control.

With reference to the first aspect, in another possible implementation of the second aspect, the obtaining the second control includes: obtaining the second control based on an SDK table, where the SDK table includes the text content and the second control. In this implementation, the SDK table is used to expand a voice control function of the electronic device, so that automatic addition and display of the second control are implemented.

It should be understood that the SDK table further includes: the first control, text content corresponding to the first control, a third control, text content corresponding to the third control, and the like.

With reference to the first aspect, in still another possible implementation of the second aspect, the method further includes: receiving again the first voice instruction input by the user; and displaying a third interface of the first application in response to the first voice instruction, where the third interface includes a service response that is output after the operation corresponding to the first voice instruction is performed.

With reference to the first aspect, in yet another possible implementation of the second aspect, the displaying a third interface of the first application in response to the first voice instruction includes: enabling the second control, performing the operation corresponding to the first voice instruction, and displaying the service response in the third interface of the first application. Alternatively, the electronic device receives the service response sent by a server, and displays the service response in the third interface of the first application. In this implementation, a function of the second control may be implemented by invoking the server, so that a voice service capability of the electronic device and user satisfaction are improved.

In addition, local software development for the second control in the electronic device is avoided and software development costs are reduced by using the cloud server to provide the service response for the electronic device.

With reference to the first aspect, in still yet another possible implementation of the second aspect, the displaying a second interface of the first application includes: displaying a control icon of the second control in the second interface of the first application; or displaying a control icon of the second interface and prompt information of the second control in the second interface of the first application.

With reference to the first aspect, in a further possible implementation of the second aspect, the second interface of the first application further includes a control icon of the third control. The third control is used to perform an operation corresponding to a second voice instruction. The control icon of the second control is in a first color, the control icon of the third control is in a second color, and the first color is different from the second color. In response to the first voice instruction, the electronic device enables the second control and performs the operation corresponding to the first voice instruction. In response to the second voice instruction, the electronic device sends an indication signal to the server. The indication signal is used to indicate the server to perform the operation corresponding to the second voice instruction.

According to a third aspect, this application provides a control display apparatus, including a display, where a first interface of a first application is displayed on the display, and the first interface includes a first control. The apparatus further includes a receiving module and a processing module.

The receiving module is configured to receive a wake-up word input by a user. The processing module is configured to: in response to the received wake-up word, indicate the display to display a second interface of the first application, where the second interface includes the first control and the second control; receive a switching operation of the user; and indicate the display to display a first interface of a second application, where the first interface of the second application includes the first control. The receiving module is further configured to receive the wake-up word input again by the user. The processing module is further configured to indicate, in response to the received wake-up word, the display to display a second interface of the second application, where the second interface of the second application includes the first control and a third control.

With reference to the third aspect, in a possible implementation of the third aspect, the processing module is further configured to obtain a first component set based on a first interface type of the first application before the second interface of the first application is displayed, where the first component set includes the second control.

With reference to the third aspect, in another possible implementation of the third aspect, the processing module is further configured to obtain a second component set based on a first interface type of the second application before the second interface of the second application is displayed, where the second component set includes the third control.

Optionally, the second interface of the first application further includes prompt information corresponding to the second control.

With reference to the third aspect, in still another possible implementation of the third aspect, the processing module is further configured to display a third interface of the first application in response to a first voice instruction, where the third interface includes a service response that is output after an operation corresponding to the first voice instruction is performed.

With reference to the third aspect, in yet another possible implementation of the third aspect, the processing module is further configured to: enable the second control, perform the operation corresponding to the first voice instruction, and indicate to display the service response in the third interface of the first application; or receive, by using a communications module, the service response sent by a server, and indicate to display the service response in the third interface of the first application.

With reference to the third aspect, in still yet another possible implementation of the third aspect, the processing module is further configured to: indicate to display a control icon of the second control in the second interface of the first application; or indicate to display a control icon of the second interface and the prompt information of the second control in the second interface of the first application.

With reference to the third aspect, in a further possible implementation of the third aspect, the second interface of the first application further includes a control icon of a fourth control. The fourth control is used to perform an operation corresponding to a second voice instruction. The control icon of the second control is in a first color, the control icon of the fourth control is in a second color, and the first color is different from the second color.

The processing module is further configured to: in response to the first voice instruction, enable the second control and perform the operation corresponding to the first voice instruction; and in response to the second voice instruction, send an indication signal to the server by using the communications module. The indication signal is used to indicate the server to perform the operation corresponding to the second voice instruction.

According to a fourth aspect, this application further provides a control display apparatus. The apparatus includes a display. In addition, the apparatus further includes a receiving module and a processing module.

The receiving module is configured to receive a wake-up word input by a user. The processing module is configured to indicate, in response to the received wake-up word, the display to display a first interface of a first application, where the first interface includes a first control. The receiving module is further configured to receive a first voice instruction input by the user. The processing module is further configured to indicate, in response to the received first voice instruction, the display to display a second interface of the first application, where the second interface includes the first control and a second control, and the second control is used to perform an operation corresponding to the first voice instruction.

With reference to the fourth aspect, in a possible implementation of the fourth aspect, the processing module is further configured to: before displaying the second interface of the first application, obtain text content corresponding to the first voice instruction, where the text content corresponds to the second control; and obtain the second control when the first interface of the first application does not include the second control.

With reference to the fourth aspect, in another possible implementation of the fourth aspect, the processing module is further configured to obtain the second control based on an SDK table, where the SDK table includes the text content and the second control.

With reference to the fourth aspect, in still another possible implementation of the fourth aspect, the receiving module is further configured to receive again the first voice instruction input by the user. The processing module is further configured to indicate, in response to the first voice instruction, the display to display a third interface of the first application, where the third interface includes a service response that is output after the operation corresponding to the first voice instruction is performed.

With reference to the fourth aspect, in yet another possible implementation of the fourth aspect, the processing module is further configured to: enable the second control, perform the operation corresponding to the first voice instruction, and indicate the display to display the service response in the third interface of the first application; or receive, by using a communications module, the service response sent by a server, and indicate the display to display the service response in the third interface of the first application.

With reference to the fourth aspect, in still yet another possible implementation of the fourth aspect, the processing module is further configured to: indicate the display to display a control icon of the second control in the second interface of the first application; or indicate the display to display a control icon of the second interface and prompt information of the second control in the second interface of the first application.

With reference to the fourth aspect, in a further possible implementation of the fourth aspect, the second interface of the first application further includes a control icon of a third control. The third control is used to perform an operation corresponding to a second voice instruction. The control icon of the second control is in a first color, the control icon of the third control is in a second color, and the first color is different from the second color.

The processing module is further configured to: in response to the first voice instruction, enable the second control and perform the operation corresponding to the first voice instruction; and in response to the second voice instruction, send an indication signal to the server. The indication signal is used to indicate the server to perform the operation corresponding to the second voice instruction.

According to a fifth aspect, this application further provides an electronic device. The electronic device includes a processor and a memory, and the processor is coupled to the memory. In addition, the electronic device may further include a transceiver and the like. The memory is configured to store computer program instructions. The processor is configured to execute the program instructions stored in the memory, to enable the electronic device to perform the method in the implementations of the first aspect or the second aspect. The transceiver is configured to implement a data transmission function.

In addition, the electronic device further includes an audio module, a loudspeaker, a receiver, a microphone, and the like. Specifically, after receiving a wake-up word input by a user, the microphone of the electronic device transmits the wake-up word to the audio module. The processor processes the wake-up word parsed by the audio module, and indicates, in response to the received wake-up word, a display to display a second interface of a first application, where the second interface includes a first control and a second control. The processor is further configured to: receive a switching operation of the user, and indicate the display to display a first interface of a second application, where the first interface of the second application includes the first control. When the microphone receives the wake-up word input again by the user, the processor is configured to indicate, in response to the received wake-up word, the display to display a second interface of the second application, where the second interface of the second application includes the first control and a third control.

Optionally, the microphone of the electronic device receives the wake-up word input by the user. The processor indicates, in response to the received wake-up word, the display to display a first interface of the first application, where the first interface includes the first control. The microphone of the electronic device further receives a first voice instruction input by the user. The processor indicates, in response to the received first voice instruction, the display to display the second interface of the first application, where the second interface includes the first control and the second control, and the second control is used to perform an operation corresponding to the first voice instruction.

According to a sixth aspect, this application further provides a computer-readable storage medium. The storage medium stores instructions. When the instructions are run on a computer or a processor, the instructions are used to perform the method according to the first aspect and the implementations of the first aspect, or used to perform the method according to the second aspect and the implementations of the second aspect.

In addition, this application further provides a computer program product. The computer program product includes computer instructions. When the instructions are executed by a computer or a processor, the method according to the implementations of the first aspect or the second aspect can be implemented.

It should be noted that beneficial effects of the technical solutions in the implementations of the third aspect to the sixth aspect are the same as beneficial effects of the implementations of the first aspect and the second aspect. For details, refer to the descriptions of beneficial effects in the implementations of the first aspect and the second aspect. Details are not described again.

DESCRIPTION OF EMBODIMENTS

To make a person skilled in the art better understand the technical solutions in embodiments of this application, the following further describes the technical solutions in embodiments of this application in detail with reference to the accompanying drawings. Before the technical solutions in embodiments of this application are described, an application scenario in the embodiments of this application is first described with reference to the accompanying drawings.

Figure 1:
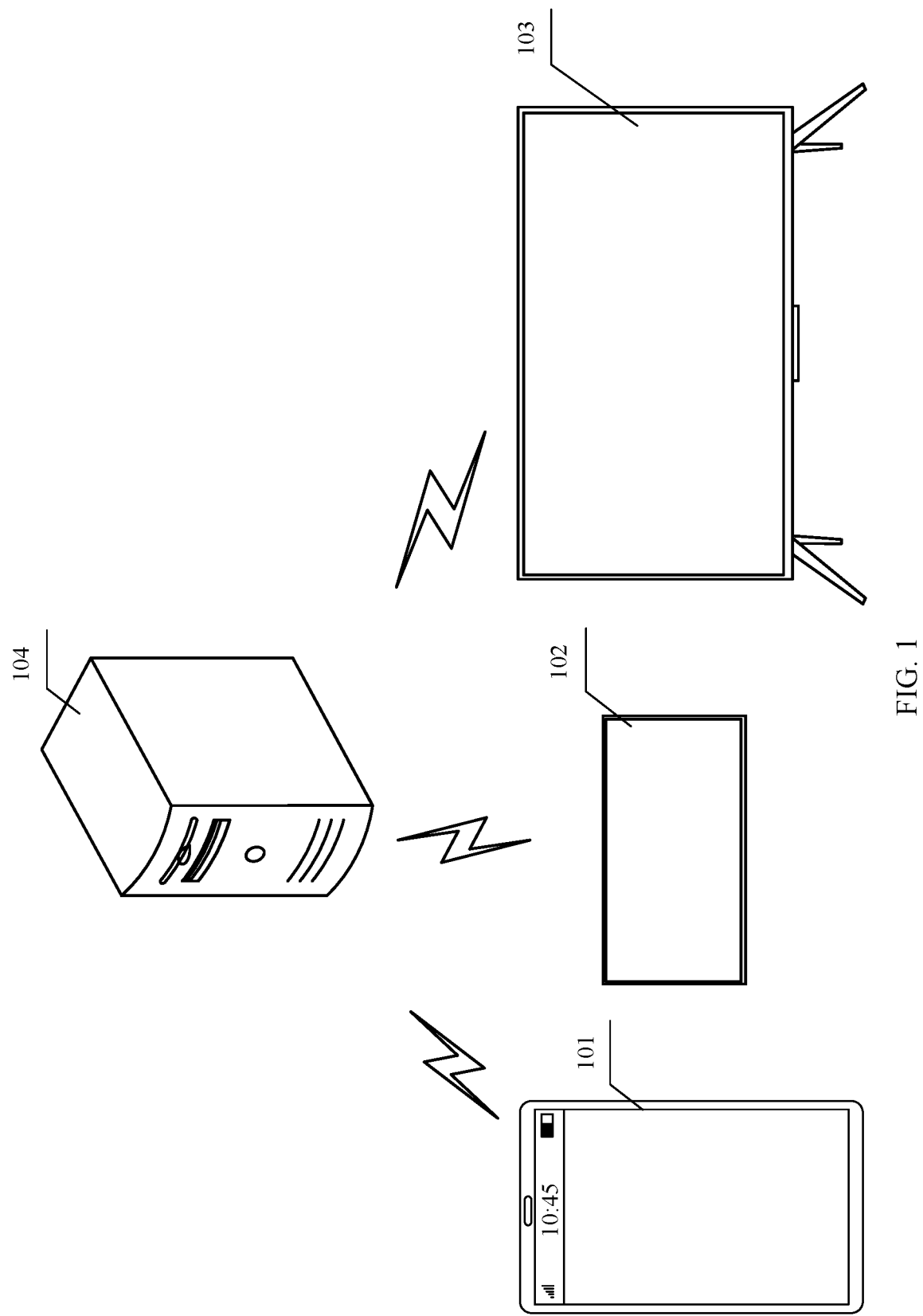
FIG. 1 is a schematic diagram of an architecture of an applied intelligent device system according to an embodiment of this application.

FIG. 1 is a schematic diagram of an architecture of an applied intelligent device system according to an embodiment of this application. The system may include at least one electronic device. The electronic device includes but is not limited to: a mobile phone, a tablet computer (Pad), a personal computer, a virtual reality (VR) terminal device, an augmented reality (AR) terminal device, a wearable device, a television (TV), an in-vehicle terminal device, and the like. For example, the system shown in FIG. 1 includes a device 101, a device 102, and a device 103, where the device 101 is a mobile phone, the device 102 is a tablet computer, and the device 103 is a TV.

In addition, the system may alternatively include more or fewer devices. For example, the system further includes a cloud server 104. As shown in FIG. 1, the cloud server 104 is separately connected to the device 101, the device 102, and the device 103 in a wireless manner, so as to implement interconnection between the device 101, the device 102, and the device 103.

Each electronic device includes an input/output apparatus, which may be configured to: receive an operation instruction input by a user by performing an operation, and display information to the user. The input/output apparatus may be a plurality of independent apparatuses. For example, the input apparatus may be a keyboard, a mouse, a microphone, or the like; and the output apparatus may be a display or the like. In addition, the input/output apparatus may be integrated into one device, for example, a touch display.

Further, the input/output apparatus may display a user interface (UI), to interact with the user. The UI is a medium interface for interaction and information exchange between an application or an operating system and the user, and is used to implement conversion between an internal form of information and a form acceptable to the user. Usually, a user interface of an application is source code written in a specific computer language such as Java or an extensible markup language (XML). Interface source code is parsed and rendered on an electronic device, and is finally presented as user-recognizable content, for example, a control such as a picture, a text, or a button.

The control, also referred to as a widget, is a basic element on the user interface. Typical controls include a toolbar, a menu bar, a text box, a button, a scrollbar, a picture, and a text. The control may have its own attribute and content. The attribute and content of the control in the user interface may be defined by using a tag or a node. For example, a control included in an interface is defined in the XML by using nodes such as <Textview>, <ImgView>, and <VideoView>. One node corresponds to one control or one attribute in the user interface. After being parsed and rendered, the node is presented as user-visible content.

In addition, for different applications, for example, a user interface of a hybrid application usually further includes a web page. The web page, also referred to as a page, may be understood as a special control embedded in a user interface of an application. The web page is source code written in a specific computer language, for example, a hypertext markup language (HTML), cascading style sheets (CSS), or JavaScript (JS). The web page source code may be loaded and displayed as user-recognizable content by a browser or a web page display component with a function similar to a function of the browser. Specific content included in the web page is also defined by using a tag or a node in the web page source code. For example, an element and an attribute of the web page are defined in the HTML by using <p>, <img>, <video>, or <canvas>.

The user interface is usually in a representation form of a graphical user interface (GUI). The GUI is a user interface that is related to an operation of the electronic device and that is displayed in a graphical manner. The graphical user interface may be an interface element such as a window or a control displayed on a display of an electronic device. In the embodiments, a display form of the control includes various visual interface elements such as an icon, a button, a menu, a tab, a text box, a dialog box, a status bar, and a navigation bar.

In the embodiments, an integrated development environment (IDE) is used to develop and generate a control, where the IDE integrates a plurality of functions such as editing, designing, and debugging in a public environment, so as to provide strong support for developers to develop applications quickly and conveniently. The IDE includes a menu, a toolbar, and some windows. The toolbar may be used to add a control to a form. The form is a small screen area, usually a rectangle, which may be used to display information to the user and receive input information from the user.

Embodiment 1

Figure 2:
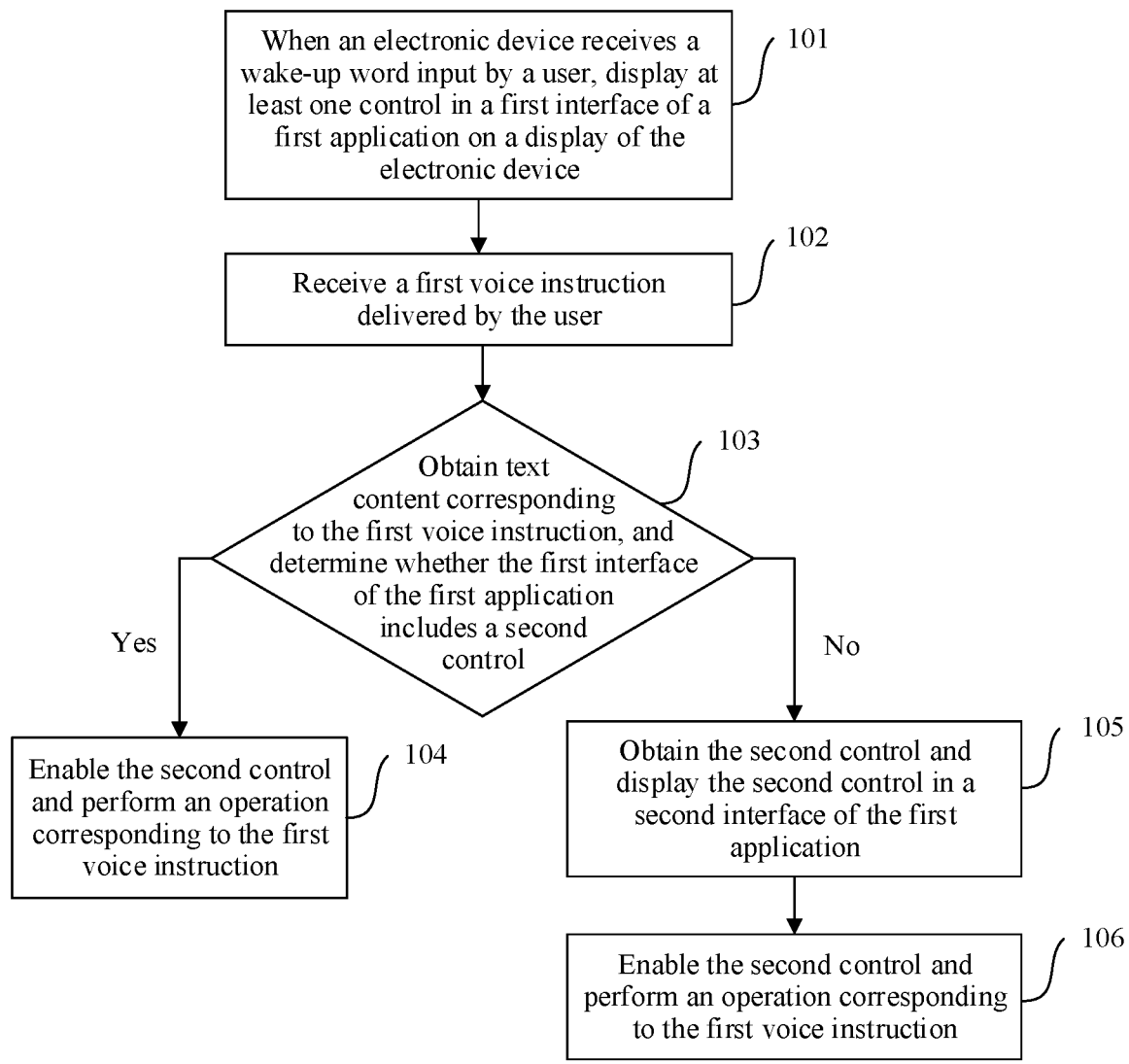
FIG. 2 is a flowchart of a control display method according to an embodiment of this application.

This embodiment provides a control display method, to provide a common voice interaction capability for a user by adding a virtual voice control to a display, so as to improve user satisfaction. The method may be applied to any one of the foregoing electronic devices. Specifically, as shown in FIG. 2, the method includes the following steps.

101: When an electronic device receives a wake-up word input by a user, display at least one control in a first interface of a first application on a display of the electronic device. The first interface may be a current interface.

Specifically, when obtaining the wake-up word input by the user, the electronic device automatically enters an instruction input state, and waits for the user to deliver a voice instruction. The wake-up word may be a predefined wake-up word, for example, Xiaoyi Xiaoyi or Xiaoai, or further includes a generalized wake-up word. For example, when a camera of the electronic device collects that attention of the user is concentrated on the current display, or when a voice instruction that meets a preset voice instruction set is detected during voice interaction between the user and the electronic device, the electronic device may be woken up, and enter a voice instruction input state.

Figure 3:
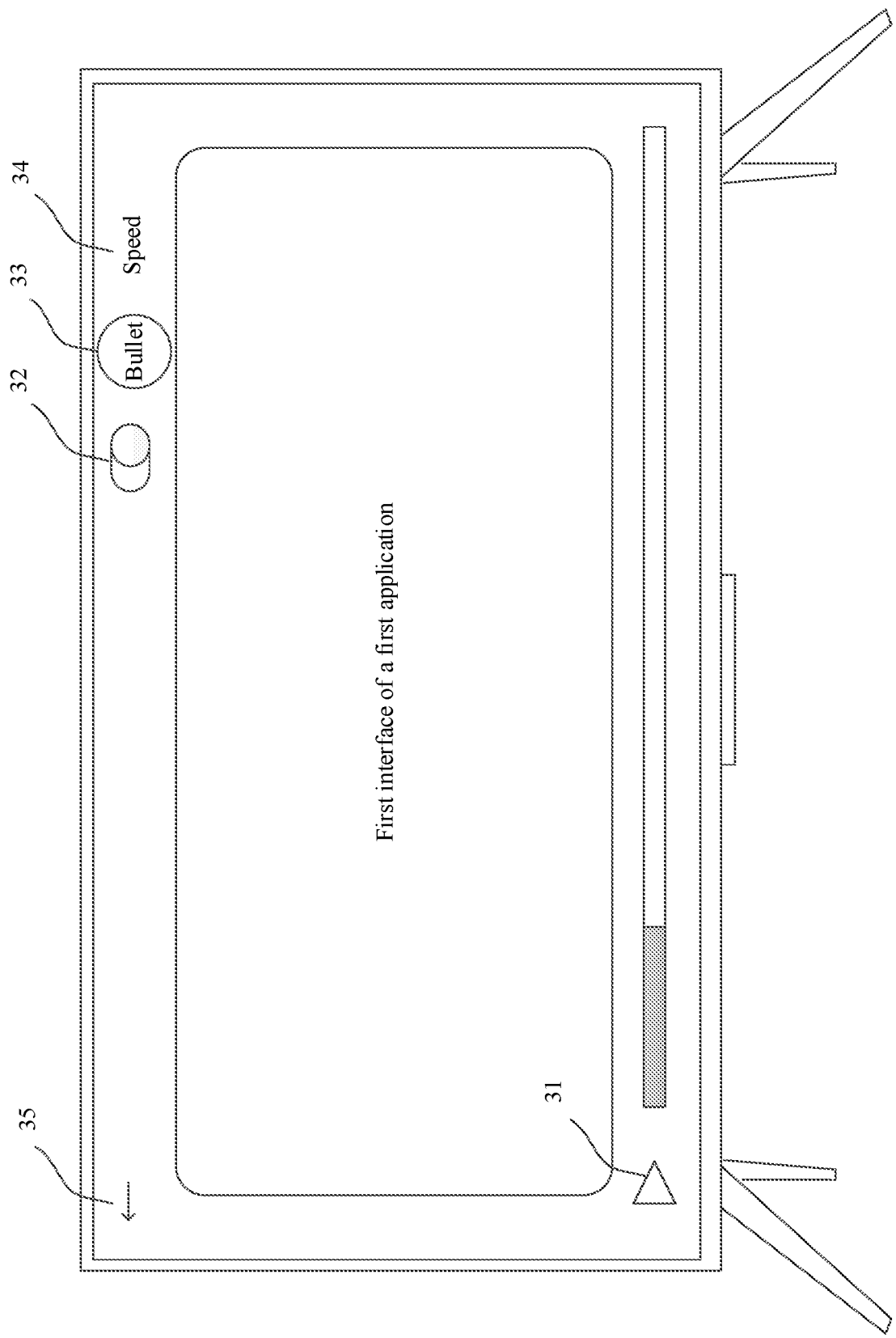
FIG. 3 is a schematic diagram of displaying a control in a first interface of a first application according to an embodiment of this application.

When the electronic device is woken up to light up the first interface of the first application, and displays, in the first interface, at least one control supported by the electronic device, the at least one control includes a first control. Optionally, in a possible implementation, the first control is a control displayed in the current interface when the electronic device is woken up. As shown in FIG. 3, the first control displayed in the current interface includes any one of the following: play/pause "▷/∥" 31, turn on/off bullet chatting "" 32, send bullet chats "" 33, speed "Speed" 34, exit "←" 35, and the like. A display form of the first control may be an icon, a button, a menu, a tab, a text box, or the like. In this embodiment, an example in which a control is displayed in an icon form is used for description. When the first application is a video playing application, for example, Huawei Video or Tencent Video, the first interface is a video playing interface. When the first application is an ebook application, the first interface is a text browsing interface.

Optionally, in another possible implementation, the first control is a common control or a control commonly used in various applications. For example, the common control may be a "play/pause" control, or the common control is any control in a virtual component set.

102: Receive a first voice instruction delivered by the user. Specifically, the electronic device receives the first voice instruction by using a microphone.

Optionally, the first voice instruction indicates a service that the user expects the current interface to respond to. For example, when the current interface is the video playing interface, the first voice instruction is "play at a 2× speed", or when the current interface is the text browsing interface, the first voice instruction is "amplify".

Optionally, when the user does not know specific voice instructions that can be responded to by the current interface, the first voice instruction may alternatively be "present a control icon" or the like.

103: Obtain text content corresponding to the first voice instruction, and determine whether the first interface of the first application includes a second control.

The text content corresponds to the second control, and the second control is used to perform an operation corresponding to the first voice instruction. Specifically, all controls in the first interface of the first application are traversed, and it is determined whether the first interface has the second control that executes the first voice instruction, for example, it is determined whether the first control in the first interface can perform an operation of "play at a 2× speed". For example, as shown in FIG. 3, control icons of all controls included in the first interface are as follows: play/pause "▷/||" 31, turn on/off bullet chatting "(⎯⎯)" 32, send bullet chats "" 33, speed "Speed" 34, and exit "←" 35. A control that can perform the operation of "play at a 2× speed" is searched for.

104: If the first interface of the first application includes the second control, enable the second control and perform the operation corresponding to the first voice instruction, to provide a service for the user.

Optionally, the method further includes: feeding back a corresponding service response to the user. For example, when the first voice instruction delivered by the user is "play at a 2× speed", and the electronic device finds that a control in the first interface can provide a function of "play at a 2× speed", the electronic device correspondingly enables the control, performs an operation of "play at a 2× speed", and displays a service response in the current interface.

105: If the first interface of the first application does not include the second control, obtain the second control, and display the second control in a second interface of the first application.

Specifically, an implementation of determining the second control is searching, based on a software development kit (SDK) table, for the second control corresponding to the first voice instruction. An SDK is a set of development tools used to create application software for a specific software package, software framework, hardware platform, operating system, and the like. Usually, the SDK is an SDK used to develop an application program on a Windows platform. The SDK not only can provide a demanding file of application program interface (API) for a program design language, but also can communicate with a specific embedded system. In this embodiment, the SDK table includes a correspondence between text content of at least one voice instruction and at least one control. The control may be represented by using a control icon. As shown in Table 1, an SDK table may include but is not limited to the following correspondences: play/pause, next episode, turn on/off bullet chatting, send bullet chats, speed, and exit.

The SDK table may be pre-stored in the electronic device, or obtained by the electronic device from a cloud server. Optionally, the SDK table may be updated in real time, and periodically obtained by the electronic device, to provide rich voice service functions for the user.

TABLE 1

| SDK table | | |
|---|---|---|
| Control icon | Text content | Prompt information |
| ▷/|| | Play/Pause | Play/Pause |
| ▷| | Play a next episode | Next episode |
| (⎯⎯) | Turn on/off bullet chatting | Turn on/off bullet chatting |
| (Bullet) | Send bullet chats | Send bullet chats |
| Speed | Speed | Speed |
| ← | Exit | Exit |

Another implementation of determining the second control includes:

105-1: Obtain a first virtual component set and a second virtual component set. The first virtual component set includes one or more controls displayed in the first interface of the first application when the electronic device receives the wake-up word and enters the instruction input state. The second virtual component set includes at least one preset control. A quantity of all controls included in the second virtual component set is greater than or equal to a quantity of controls in the first virtual component set. The second virtual component set is associated with a first interface type of the first application. Optionally, the first interface type of the first interface includes video playing, music playing, picture/photo preview, text browsing, and the like.

The second virtual component set includes the second control. The second control may be a common control. For example, when the first voice instruction delivered by the user in step 102 is "play a next episode", and a "next episode" control is a voice control in a virtual component set of an interface type of a video playing interface, it is determined that the second virtual component set is a virtual component set corresponding to the video playing interface.

105-2: Determine the second control, where the second control belongs to the second virtual component set but does not belong to the first virtual component set. There may be one or more second controls.

For example, the first virtual component set includes only one "play/pause" control, and the second virtual component set includes six controls: play/pause, next episode, turn on/off bullet chatting, send bullet chats, speed, and exit. Therefore, it is determined that the second control has all controls except the "play/pause" control. In this example, the second control includes: next episode, turn on/off bullet chatting, send bullet chats, speed, and exit.

In step 105, after determining the second control from the SDK table, the electronic device adds a control icon corresponding to the second control to the second interface of the first application. Similarly, if the electronic device determines a plurality of second controls based on the virtual component set, all the second controls are displayed in the second interface.

Figure 4A:
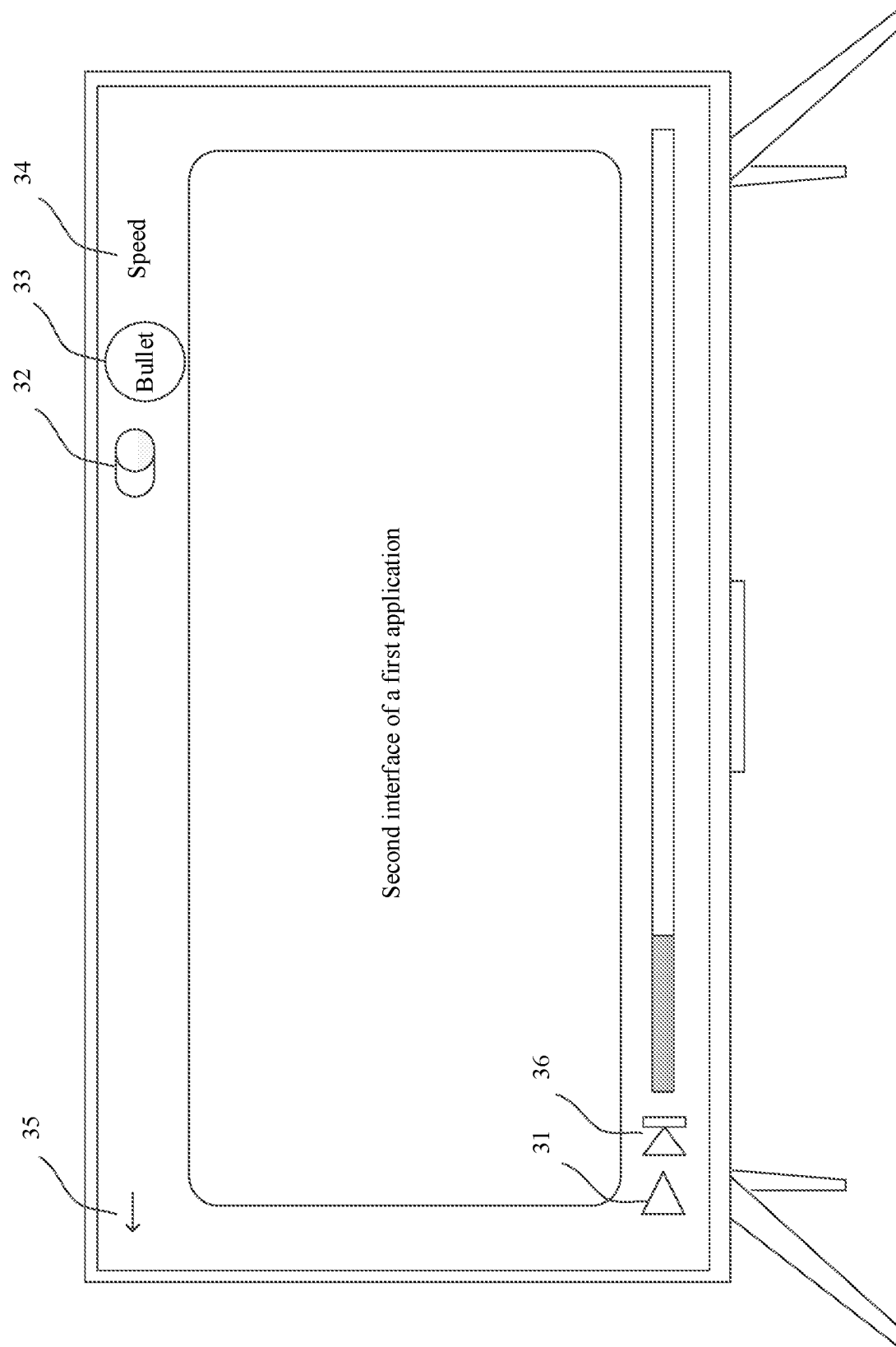
FIG. 4A is a schematic diagram of displaying a second control in a second interface of a first application according to an embodiment of this application.

Specifically, for example, as shown in FIG. 4A, when it is determined that the second control is the "next episode" control, a control icon "▷|" 36 corresponding to the "next episode" control is displayed in a current video playing interface (that is, the second interface). In addition, the second interface further includes the first control. In this example, a control icon corresponding to the first control includes

▷/| 31, (⚙) 32, (Bullet) 33, Speed 34, and ←35.

Figure 4B:
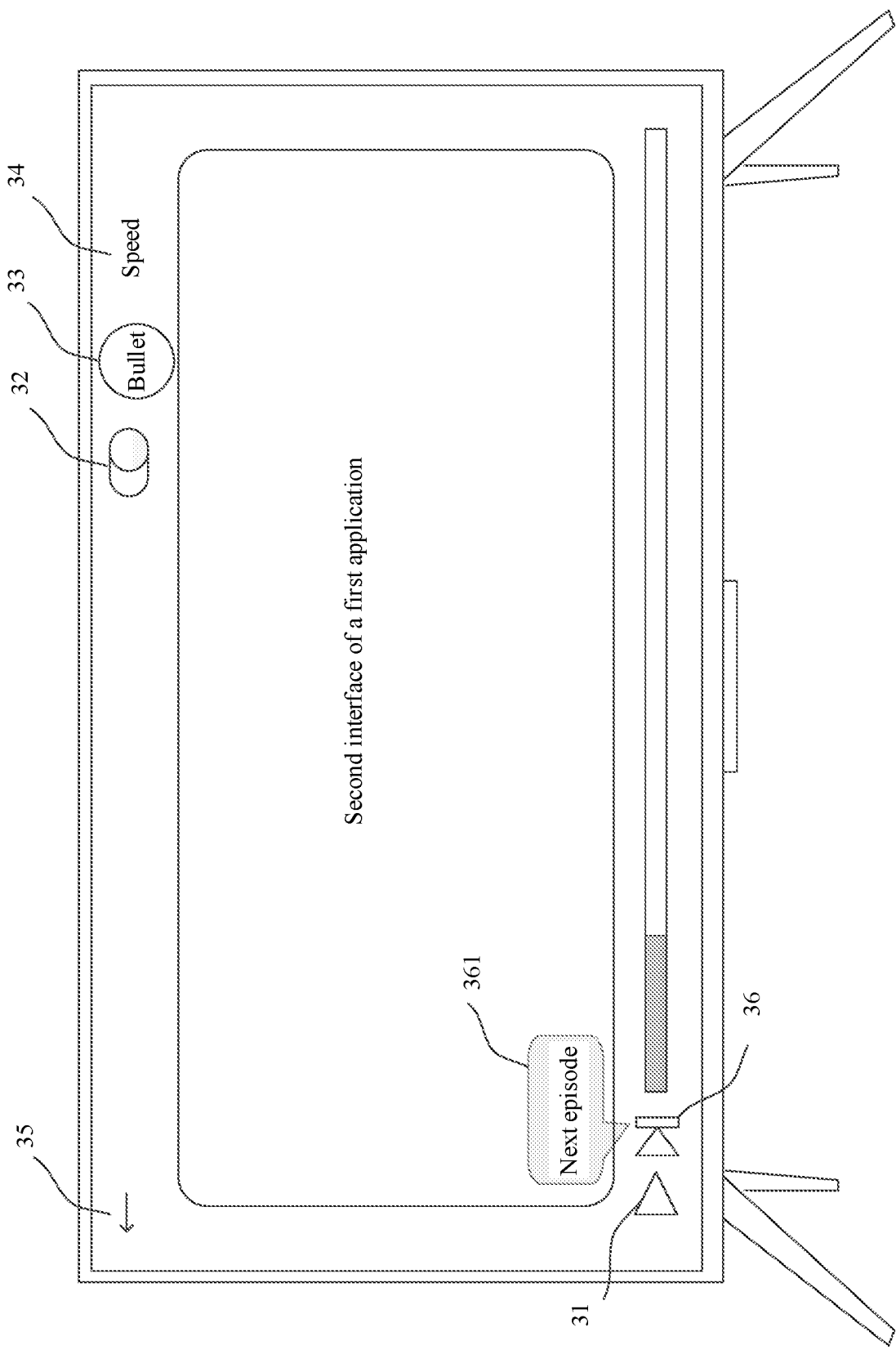
FIG. 4B is a schematic diagram of displaying prompt information in a second interface of a first application according to an embodiment of this application.

Optionally, the method further includes: adding prompt information corresponding to the second control to the second interface. Each control corresponds to one piece of prompt information, and each piece of prompt information gives a prompt of a voice function corresponding to the control. The user may deliver a corresponding voice instruction based on the prompt information. When receiving a voice instruction including the prompt information, the electronic device enables, based on the correspondence, a control corresponding to the voice instruction. For example, as shown in FIG. 4B, when the first voice instruction input by the user is "play a next episode", it is queried that the first interface shown in FIG. 4A does not include a voice control corresponding to an operation of jumping to a next episode, and it is determined, based on the SDK table, that the second control is the "next episode" control, the control icon "▷|" 36 corresponding to the second control and prompt information "next episode" 361 corresponding to the second control are added to the second interface shown in FIG. 4B, to present to the user that the current interface supports the voice instruction for playing a next episode.

Optionally, the correspondence between the prompt information and the control may be stored in the foregoing SDK table, or stored separately. This is not limited in this embodiment. In addition, the prompt information may be the same as or different from the text content. The first voice instruction delivered again by the user may include more voice content in addition to the prompt information. This is not limited in this embodiment.

Optionally, when the second control is displayed, the control icon corresponding to the second control and the prompt information may be displayed together in a blank area of the current interface, or may be added to the current interface in a form of a floating window. A specific adding manner is not limited in this embodiment.

According to the method provided in this embodiment, after the electronic device is woken up by the user, the electronic device may display, in the current interface of the electronic device, a control corresponding to any voice instruction delivered by the user, to provide a corresponding service when the user delivers the voice instruction again. This avoids a disadvantage that the voice instruction delivered by the user cannot be executed in the current interface of the electronic device because controls in different application interfaces are different. In this method, the SDK table or the virtual component set is used to expand a voice control function of the electronic device, so that automatic addition and display of the second control are implemented, and a service function of voice text content and user satisfaction are improved.

In addition, the method further includes:

106: Enable the second control and perform the operation corresponding to the first voice instruction, to provide a voice service for the user.

Specifically, in a possible implementation, after the second control is displayed in the second interface of the first application based on the SDK table, the second control is directly enabled, the operation corresponding to the text content of the first voice instruction is performed, and a service response is output.

In another possible implementation, when the electronic device obtains again the first voice instruction delivered by the user, where the text content corresponding to the first voice instruction may include the prompt information corresponding to the second control or may be the same as the prompt information corresponding to the second control, the second control is enabled, the operation corresponding to the first voice instruction is performed, and a service response is output. For example, when the voice instruction of "play a next episode" (or "next episode") delivered again by the user is received, and text content obtained by parsing the voice instruction includes "next episode", the "next episode" control is enabled, and an operation of playing a next episode is performed, to provide a voice service for the user.

Optionally, the process of enabling the second control and outputting the service response specifically includes:

106-1: Detect whether the second control in the second interface of the electronic device can perform the operation corresponding to the first voice instruction, that is, determine whether the second control can provide a function service for the first voice instruction.

106-2: If the second control in the second interface of the electronic device cannot perform the operation corresponding to the first voice instruction, that is, the second control cannot provide the function service, the electronic device may obtain a service response by using the cloud server or another electronic device. The service response is generated after the cloud server or the another electronic device performs the operation corresponding to the first voice instruction, transmitted to the electronic device, and displayed by the electronic device on the display after the electronic device receives the service response. For example, after the electronic device receives a second voice instruction "zoom in on a picture" delivered by the user, if the second control in the second interface of the electronic device does not support a function of "zoom in on a picture", the electronic device sends an original picture to the cloud server or a second electronic device, and the cloud server or the second electronic device performs zoom-in processing on the original picture. Optionally, the cloud server may further send the original picture to another electronic device having the function of "zoom in on a picture", obtain a zoomed-in picture, and finally send the zoomed-in picture to the electronic device.

In this method, local software development for the second control in the electronic device is avoided and software development costs are reduced by using the cloud server to provide the service response for the electronic device.

106-3: If the second control in the second interface of the electronic device can perform the operation corresponding to the first voice instruction, that is, the second control can provide the function service, enable the second control, perform the operation corresponding to the first voice instruction, and output a service response. A specific process is the same as that in step 104, and details are not described again.

Optionally, after step 105, the method further includes: When the electronic device receives a second voice instruction delivered by the user, and obtains text content corresponding to the second voice instruction, where the text content corresponding to the second voice instruction is different from the text content of the first voice instruction in step 102, but the text content corresponding to the second voice instruction is the same as text content of a second control already added in step 105, the added second control is enabled, an operation corresponding to the text content of the second voice instruction is performed, and a corresponding service response is output.

For example, the second voice instruction is "turn off bullet chatting", and the second voice instruction of "turn off bullet chatting" is different from the first voice instruction of "play a next episode". When a second control for "turn off bullet chatting" is already added to the second interface of the electronic device, the second control is enabled, an operation of "turn off bullet chatting" is performed, and an operation result is displayed to the user in the current interface.

It should be understood that a control for performing the text content of the second voice instruction may be one of the plurality of second controls determined based on the virtual component set, or may be one of a plurality of controls originally included in the electronic device. This is not limited in this embodiment.

Optionally, after the second control is obtained or determined, the method further includes: The electronic device displays, in a differentiated manner, a control that is supported by the electronic device to provide a voice service and a control that is not supported by the electronic device to provide a voice service. For example, the electronic device displays, in the second interface, the control supported by the electronic device in a first color (for example, green) and the control not supported by the electronic device in a second color (for example, red), so that the user can make easy identification and differentiation. It should be understood that another manner for differentiation may alternatively be used, for example, marking. A specific manner for differentiation is not limited in this embodiment. As described above, for the control not supported by the electronic device, a service response needs to be obtained for a voice instruction corresponding to the control by using the cloud server or the another electronic device.

According to the method provided in this embodiment, after the electronic device adds the second control, functions of all the second controls may be implemented by invoking the cloud server, so that a service capability of the electronic device is improved, functions of all voice controls displayed in the current interface are provided for the user, and user satisfaction is improved.

In addition, in step 105, the displayed service response corresponding to the second control may include an interface response and a global response. Correspondingly, in step 104 and/or step 106, the service response output by the electronic device includes an interface response and a global response. Specifically, the interface response means that the electronic device does not need to jump from the current first application to a second application when the electronic device performs an operation. The operation can be completed in an interface of the current first application, for example, the foregoing operations such as "play a next episode", "turn off bullet chatting", and "zoom in on a picture".

Figure 5:
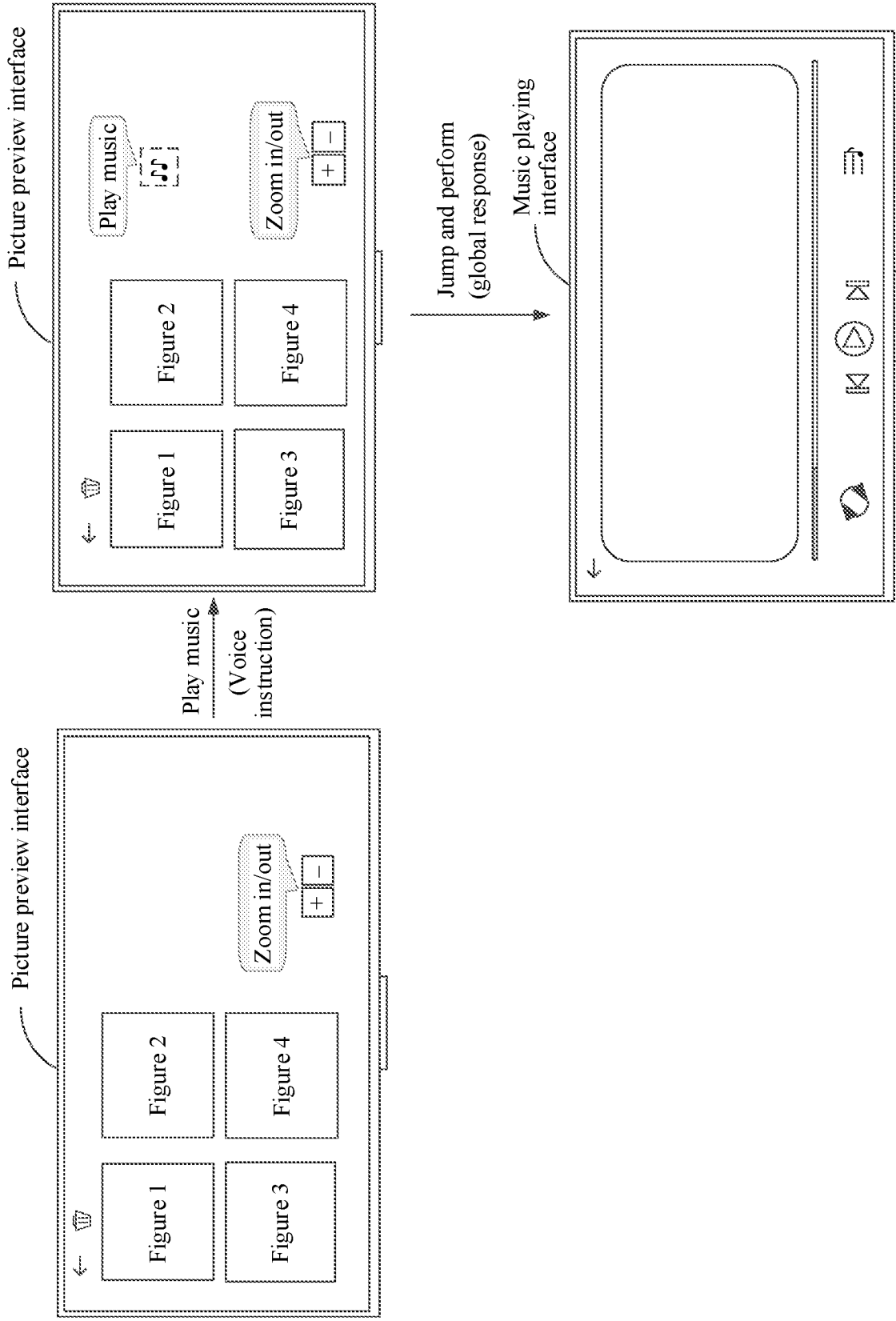
FIG. 5 is a schematic diagram of jumping to a global response based on a voice instruction according to an embodiment of this application.

The global response means that the electronic device needs, when performing an operation, to jump from the current first application to a second application, and provide a service response in an interface of the second application. For example, as shown in FIG. 5, a possible implementation includes: The interface of the first application is a picture preview interface. When the user delivers a voice instruction of "play music", it is first determined, based on the descriptions in steps 103 and 105, that a control that needs to be added is a "play music" control, then a control icon "♪♪" of the "play music" control is added to the picture preview interface, and then an application interface corresponding to "play music" is jumped to, for example, the second application. In this case, the interface of the second application is a music playing interface. Finally, according to the descriptions in step 106, the "play music" control is enabled directly when the voice instruction input by the user is received again, and an operation corresponding to the music playing instruction is performed, to provide a music playing function for the user. The voice instruction of "play music" is a switching instruction. After receiving the switching instruction, the electronic device performs an interface switching operation.

The interface of the first application or the interface of the second application includes interfaces such as video playing, music playing, picture/photo preview, text browsing, dialing, and message sending.

Optionally, for the interface response, a voice instruction delivered by the user may be referred to as an interface voice; and for the global response, a voice instruction delivered by the user may be referred to as a global voice.

Optionally, the "play music" control may be displayed in the picture preview application interface in a form of a floating window, and controls such as a music list, a song name, and play/pause may be displayed in the floating window. In addition, in the video playing application interface, a program list may be further displayed in the list, for example, a list of live programs on all TV channels.

Embodiment 2

An embodiment further provides another control display method. A difference from Embodiment 1 lies in that, before a user delivers a first voice instruction, in this embodiment, a second control is already determined, and the second control is displayed in an application interface of an electronic device, to provide rich service responses for the user.

Figure 6:
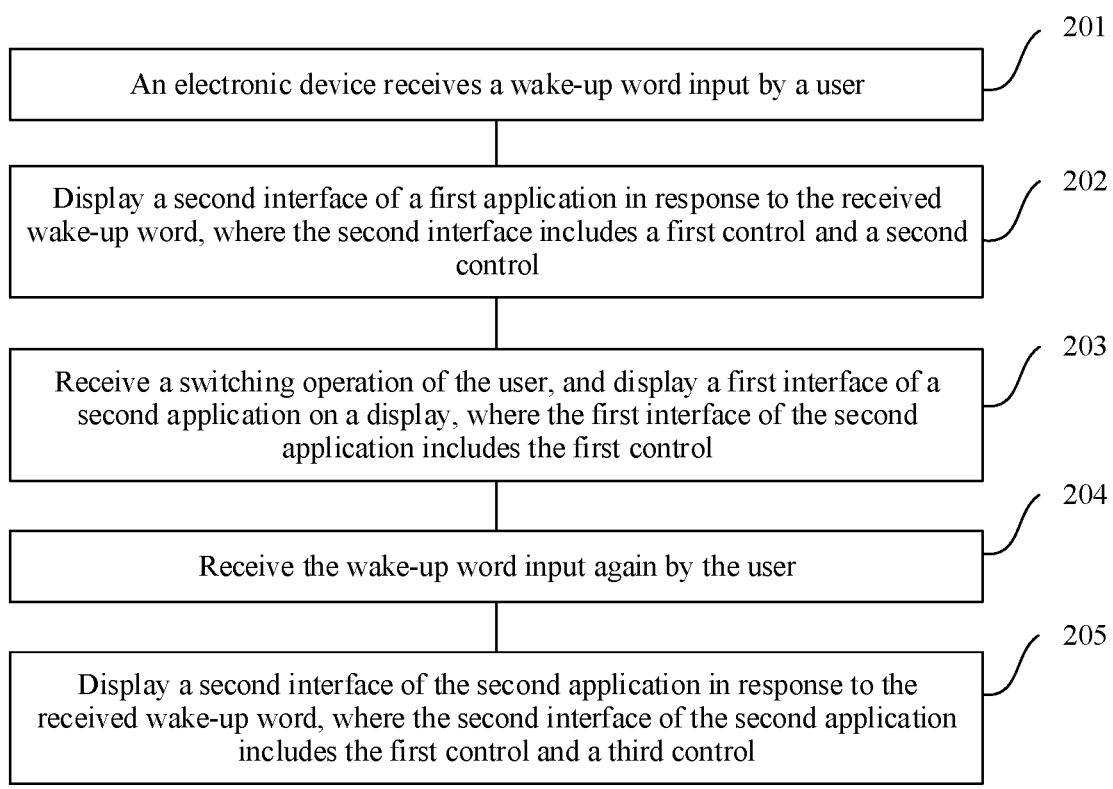
FIG. 6 is a flowchart of another control display method according to an embodiment of this application.

A first interface of a first application is displayed on a display of the electronic device. The first interface includes a first control. As shown in FIG. 6, the method includes the following steps.

201: An electronic device receives a wake-up word input by a user.

202: Display a second interface of a first application in response to the received wake-up word, where the second interface includes a first control and a second control. Specifically, the step includes:

202-1: Obtain a first virtual component set and a second virtual component set in response to the received wake-up word.

Figure 7A:
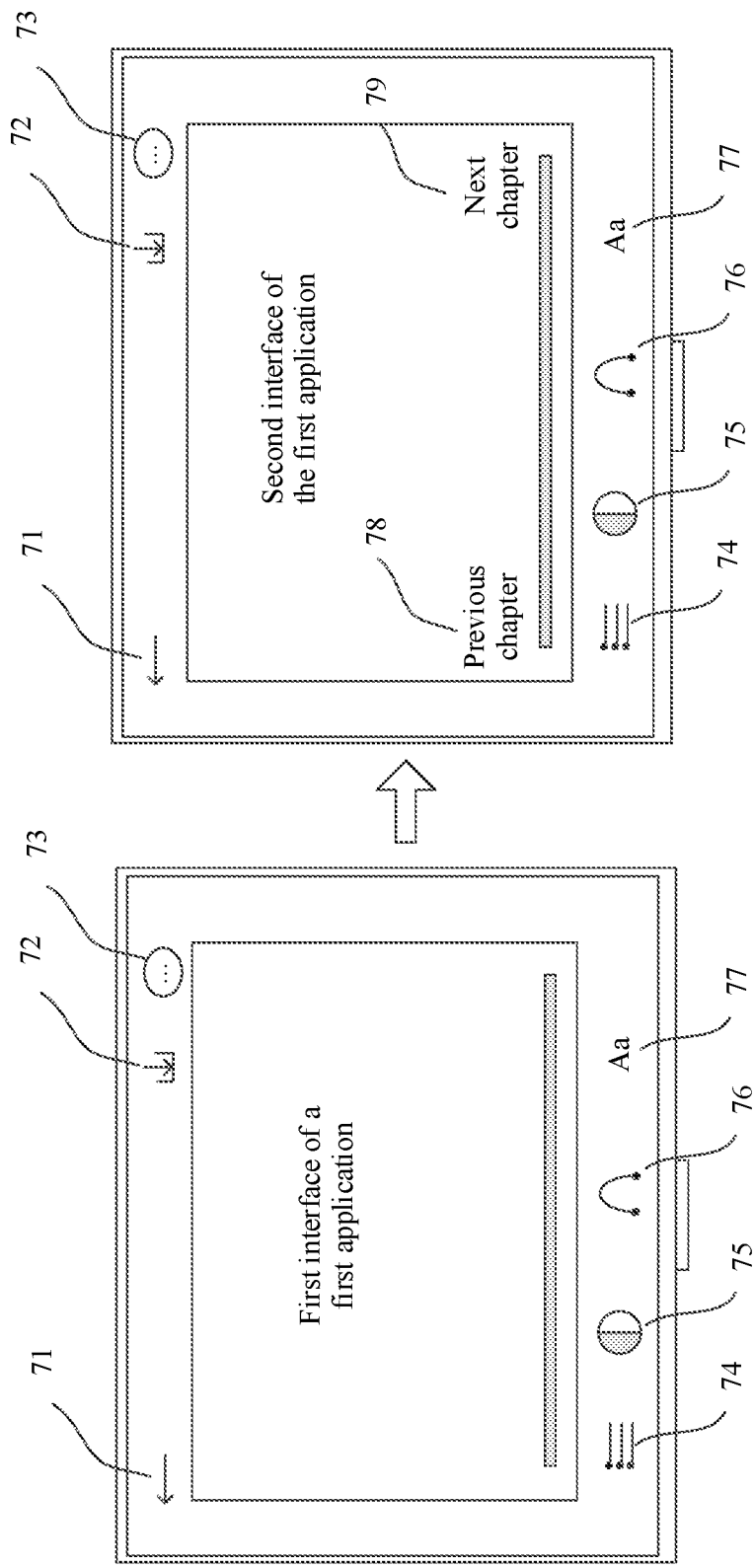
FIG. 7A is a schematic diagram of displaying a second control in a second interface of a first application according to an embodiment of this application.

The first virtual component set is associated with a first interface of the first application, and includes one or more controls displayed in the first interface when the electronic device is woken up. As shown in FIG. 7A, when the first application of the electronic device is an ebook application (APP), controls displayed in the first interface include: exit "←" 71, download "⬇" 72, message bar "☺" 73, contents "≡" 74, eye comfort brightness "☀" "☀" 75, textto-speech "⟨⟩" 76, and reading settings "Aa" 77. A set including these controls is the "⟨⟩" first virtual component set.

The second virtual component set is associated with a first interface type of the first application. The first interface type is text browsing. A virtual component set corresponding to the text browsing includes at least one common control. The common controls may include all controls in the first virtual component set, and a quantity of all controls included in the second virtual component set is greater than or equal to a quantity of controls in the first virtual component set. Optionally, the common control may be created and added by using an SDK.

Specifically, a method for obtaining the second virtual voice component set is implemented by the electronic device based on the first interface type of the first application. A correspondence exists between an interface type of each application and a virtual component set. As shown in Table 2, the electronic device may determine, based on the correspondence, a virtual component set corresponding to an interface type of a current application, that is, the second virtual component set.

TABLE 2

Correspondence between an interface type and a virtual component set

| Interface type | Virtual component set | Control icon | Prompt information |
|---|---|---|---|
| Video playing | Virtual component set 1 | ▷/‖ | Play/Pause |
| | | ▷▷ | Next episode |
| | | (⋯) | Turn on/off bullet chatting |
| | | Bullet | Send bullet chats |
| | | Speed | Speed |
| | | ← | Exit |
| Music playing | Virtual component set 2 | ▷ | Play |
| | | ◁◁ | Previous song |
| | | ▷▷ | Next song |
| | | ← | Exit |
| | | ◯ | Play mode |
| | | ♫ | Playlist |
| | | ♪♪ | Play music |
| Picture/ Photo preview | Virtual component set 3 | ← | Exit |
| | | 🗑 | Delete |
| | | +/− | Zoom in/out |
| Text browsing | Virtual component set 4 | ← | Exit |
| | | ⬇ | Download |
| | | ⊙ | Message bar |
| | | ≡ | Contents |
| | | ◐ | Eye comfort brightness |
| | | ⟨⟩ | Text-to-speech |
| | | Aa | Reading settings |
| | | Previous chapter | Previous chapter |
| | | Next chapter | Next chapter |

As shown in Table 2, each interface type corresponds to one virtual component set. For example, the text browsing interface corresponds to a "virtual component set 4", and when it is determined that the virtual component set 4 is the second virtual control set, the second virtual control set includes all controls in the virtual component set 4.

Optionally, the foregoing correspondences may be combined with the SDK table in Embodiment 1 to form a new relationship table. The new relationship table includes content such as the interface type, the virtual component set, the control icon included in each virtual component set, and the prompt information corresponding to each control.

202-2: Determine the second control based on the first virtual component set and the second virtual component set, where the second control is a control that belongs to the second virtual component set but does not belong to the first virtual component set.

202-3: Display all second controls in the second interface of the first application.

When the second control is displayed, a control icon and prompt information that correspond to each second control may be displayed together in a blank area of the second interface, or displayed in a form of a floating window. The blank area may be understood as an area that is not covered by a control. Alternatively, when no blank area exists, a size of an existing control icon in the interface may be reduced or moved to free up a blank area, and then the control icon and the prompt information are displayed in the blank area. A position and a manner of displaying the second control are not limited in this embodiment.

In the example shown in FIG. 7A, when the first application is the ebook application (APP), the ebook application (APP) displays the first interface, and the electronic device obtains the first virtual component set based on the first interface of the first application. The first virtual component set includes the following controls: exit "←" 71, download "⬇" 72, message bar "⊙" 73, contents "≡" 74, eye comfort brightness "◐" 75, text-to-speech "⟨⟩"76, and reading settings "Aa" 77. The electronic device determines that an interface type of the first interface is a type of a "text browsing" interface, obtains the second virtual component set based on the "text browsing" interface, where the second virtual component set corresponds to the "virtual component set 4" in Table 2, and searches for the "virtual component set 4" in Table 2 to obtain the following controls: exit "←" 71, download "⬇" 72, message bar "⊙" 73, contents "≡" 74, eye comfort brightness "◐" 75, text-to-speech "⟨⟩" 76, reading settings "Aa" 77, previous chapter "Previous chapter" 78, and next chapter "Next chapter" 79. If it is determined, based on the first virtual component set and the second virtual component set, that second controls to be added are "Previous chapter" 78 and "Next chapter" 79, control icons "Previous chapter" 78 and "Next chapter" 79 corresponding to the second controls are added to the second interface of the first application.

In addition, the method further includes: enabling the second control, performing an operation corresponding to the second control, and outputting a service response. A specific execution process is the same as that in step 106 in Embodiment 1.

203: Receive a switching operation of the user, and display a first interface of a second application on the display, where the first interface of the second application includes the first control. The switching operation corresponds to a global response.

Figure 7B:
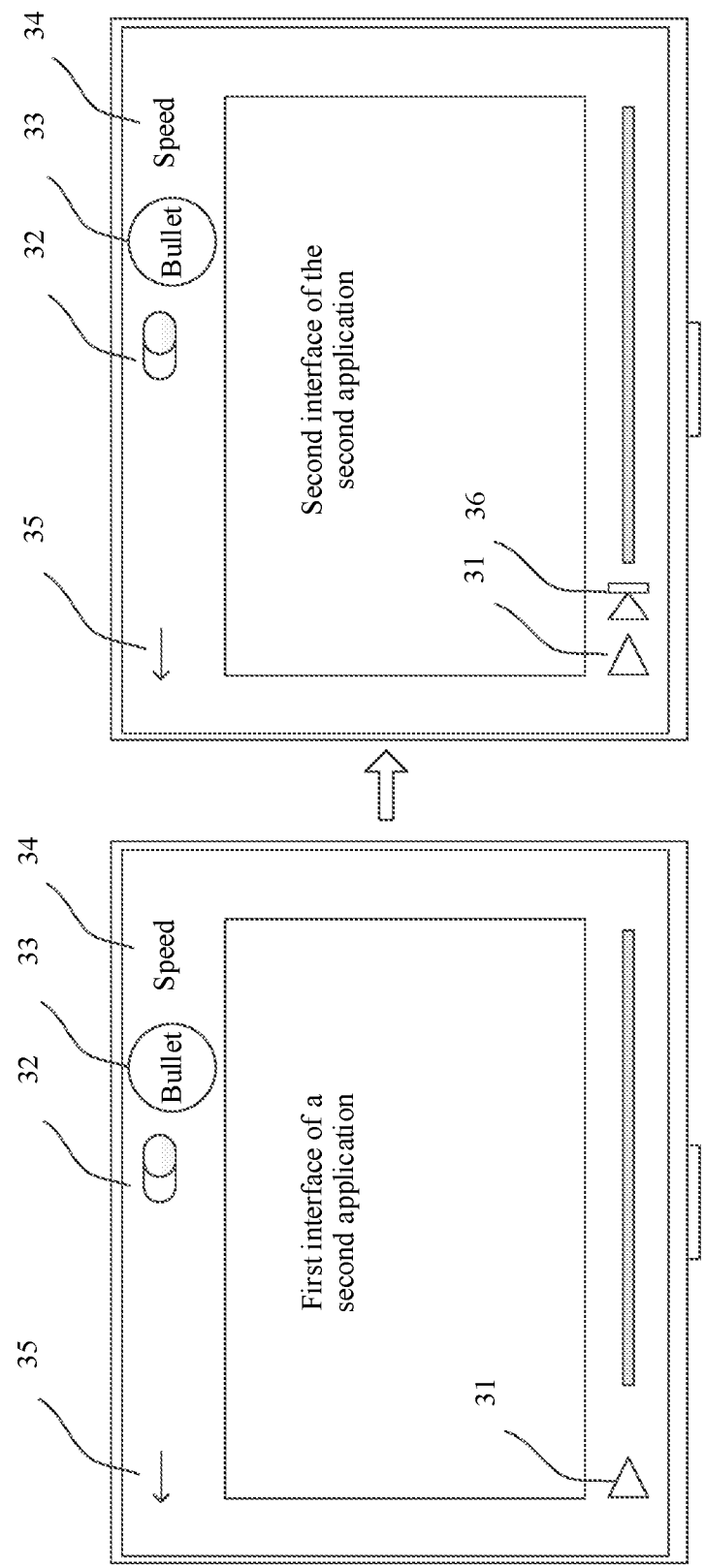
FIG. 7B is a schematic diagram of displaying a third control in a second interface of a second application according to an embodiment of this application.

The switching operation may be manual switching performed by the user, or the switching operation is started based on a voice instruction input by the user. For example, when the user delivers a voice instruction of "read news", the electronic device receives and parses the voice instruction, and performs an interface switching operation. As shown in FIG. 7B, the ebook application (APP) is switched to the second application. The second application is a video playing application, and an interface of the video playing application includes the first control. As shown in FIG. 7B, the first interface of the second application includes the following first controls: play/pause "▷/‖" 31, turn on/off bullet chatting "(⋯)" 32, send bullet chats "Bullet" 33, speed "Speed" 34, and exit "←" 35. The exit control "←" 35 is the same as the control "←" 71 in the first interface of the first application.

204: Receive the wake-up word input again by the user.

205: Display a second interface of the second application in response to the received wake-up word, where the second interface of the second application includes the first control and a third control. A component set corresponding to a first interface type of the second application is a third virtual component set.

In the example shown in FIG. 7B, when the user inputs the wake-up word again, for example, "Xiaoyi Xiaoyi", the electronic device determines that an interface type corresponding to the current video playing application is a type of a "video playing" interface, and searches, based on Table 2, for a "virtual component set 1" corresponding to the "video playing" interface. The virtual component set 1 includes the following controls: play/pause, next episode, turn-on/off bullet chatting, send bullet chats, speed, and exit. Compared with the controls included in the first interface of the second application, the third control is determined as "next episode", and a control icon "▷|" 36 of "next episode" is added to the second interface of the second application. A specific adding process is the same as that in Embodiment 1, and details are not described again in this embodiment.

In addition, the method further includes: enabling the third control, performing an operation corresponding to the third control, and displaying an output service response in the interface of the second application. For example, when the user delivers a voice instruction of "play a next episode", the "next episode" control 36 is enabled, a voice instruction operation of "play a next episode" is performed, and then video content of the next episode is displayed in the interface of the second application. For a specific process, refer to step 106 in Embodiment 1. Details are not described herein again.

Optionally, when the electronic device receives another voice instruction delivered by the user, and the voice instruction corresponds to a fourth control in the second interface of the second application, the electronic device enables the fourth control, performs an operation corresponding to the current voice instruction delivered by the user, and displays a response result in the current interface of the second application. The fourth control may be any one of play/pause

"▷/|" 31, turn on/off bullet chatting "⬚" 32, send bullet chats  33, speed "Speed" 34, and exit "←" 35.

In addition, the electronic device may further differentiate, by using different colors or marks, a control that is supported by the electronic device to provide a voice service and a control that is not supported by the electronic device to provide a voice service. In addition, for the control that is not supported by the electronic device to provide a voice service, a control function may be implemented by using a cloud server, to provide rich voice service functions for the user. For a more specific differentiating and invoking capability process, refer to Embodiment 1. Details are not described herein again.

According to the method provided in this embodiment, a virtual component set corresponding to each interface type is set, and the virtual component set is compared with controls included in a current interface to determine controls that are not included in the current interface but are commonly used, and these controls are automatically added to the current interface of the electronic device. For example, when receiving the wake-up word input by the user, the electronic device automatically adds and displays, in a current interface of the first application, the second control that is not included in the current interface, to implement automatic addition and display of the second control associated with the first application. This ensures that a same voice control is displayed in a same application. For example, according to this method, voice controls of "Previous chapter" and "Next chapter" are displayed on interfaces of different ebook applications, so that the user can make easy voice interaction and user experience is improved.

In addition, when the first application is switched to the second application, the third control is automatically added and displayed in a current interface of the second application, so that all controls corresponding to an interface type of the current application can be displayed on the display of the electronic device based on the interface type when the user switches applications. For example, when the ebook application is switched to the video playing application, the voice control of "next episode" that is not included in a current interface can be automatically added and displayed in the video playing interface. In this way, all voice controls associated with different applications are displayed on the display of the electronic device, so that a voice service function of the electronic device and user satisfaction are improved.

In addition, for a purpose of improving efficiency of voice interaction between the control and the user, in addition to the second control and the third control, prompt information corresponding to the newly added control is further displayed. For example, when a "search" control is newly added, the following prompts may be included in a search box of the "search" control:

Prompt 1: A text or floating annotation text is displayed in or outside the search box, for example, "Please speak out the content to be searched, for example, the $100^{th}$ element or a nice-looking pen", and the annotations are highlighted.

Prompt 2: A text or floating annotation text is displayed in or outside the search box. The search text can be generalized information such as "search for pictures or search for information", or hot words such as "Roast Show" and "COVID-19 virus".

After the user speaks out voice content for searching based on the foregoing prompt, the electronic device automatically and quickly performs searching based on a preset text, searches a database for a result, and outputs a service response.

In addition, in Embodiment 1 and Embodiment 2, the method further includes: automatically creating and updating a control set, to provide rich voice service functions for different electronic devices.

Figure 8:
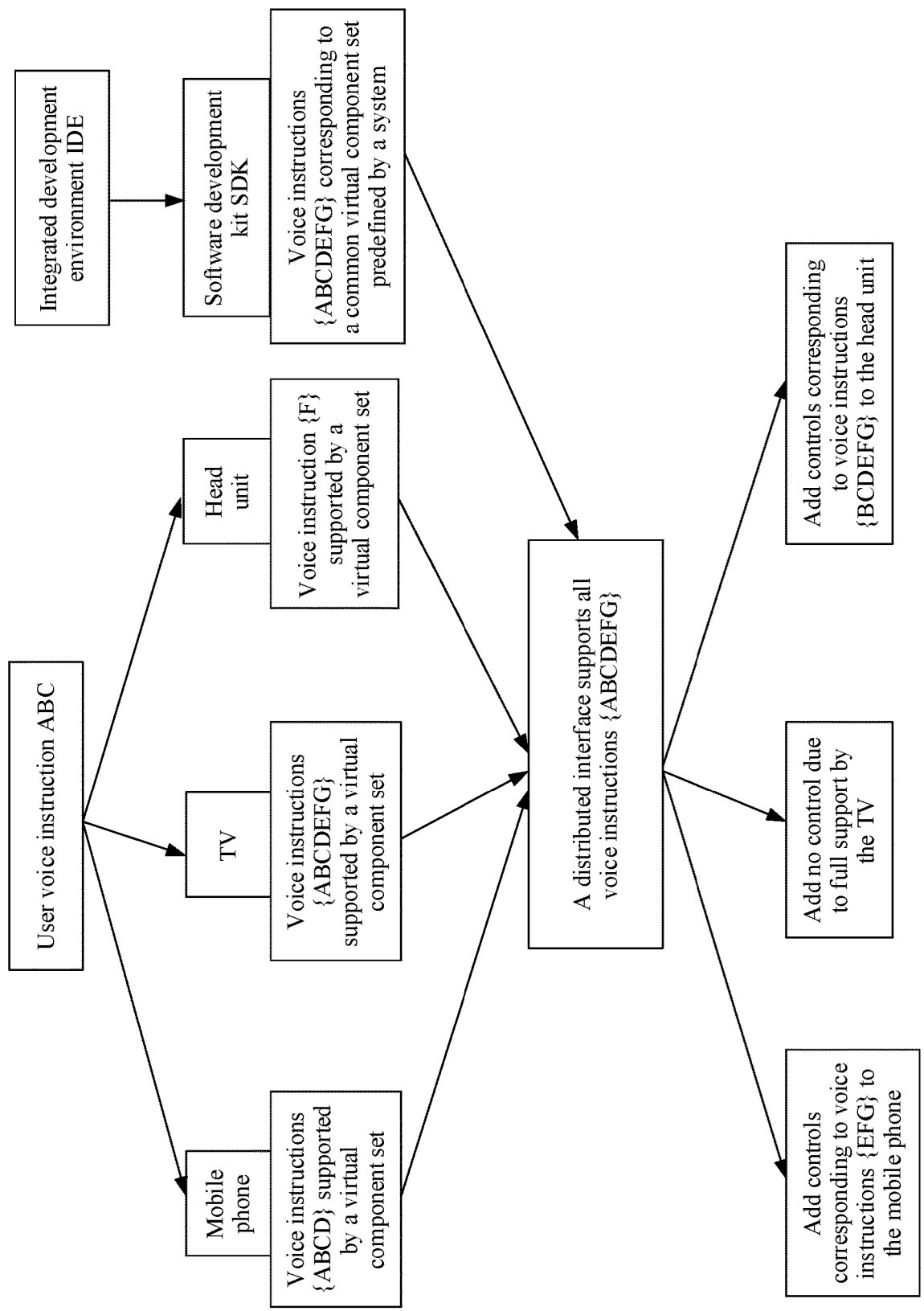
FIG. 8 is a schematic diagram of a distributed interface supporting all voice instructions according to an embodiment of this application.

Specifically, in a possible implementation, various voice controls are developed and created by using an IDE. As shown in FIG. 8, a voice environment includes devices such as a mobile phone, a TV, and a head unit. Each device includes a different voice control, and supports a different function of the voice control. For example, voice instructions for which a virtual component set of the mobile phone terminal can provide a service include {A, B, C, D}; voice instructions supported by a virtual component set of the TV include {A, B, C, D, E, F, G}; and a voice instruction supported by a virtual component set of the head unit includes {F}. In addition, a common virtual component set predefined by a system is further included. For example, voice instructions that can be supported by a voice control developed in an IDE environment by using an SDK include {A, B, C, D, E, F, G}, and cover all voice instructions in distributed interfaces of a plurality of devices.

For a purpose of improving a service function of any electronic device, at least one target control is added to the devices such as the mobile phone, the TV, and the head unit based on a virtual component set that is of all voice instructions and that is integrated by using the SDK, so as to ensure that each device has a capability of executing all voice instructions. This improves user experience.

For example, for the mobile phone, after the voice instructions stored in the distributed interface are compared with the voice instructions supported by the mobile phone, it is determined to add controls corresponding to voice instructions {E, F, G} to an application interface of the mobile phone, so that the mobile phone can perform all operations of the voice instructions A to G. Similarly, for the TV, because types of voice instructions currently stored in the TV are the same as those of voice instructions in the SDK, that is, the TV can perform operations of all voice instructions, no new control needs to be added. For the head unit, controls corresponding to voice instructions {B, C, D, E, F, G} that are not included in the head unit need to be added. A specific method for adding a corresponding control is the same as the method in the foregoing embodiment. Details are not described again.

In this embodiment, a new virtual component set created and developed by using the IDE includes voice controls that can execute all voice instructions in the distributed interface, and these controls are automatically added to different electronic devices, so that voice service capabilities of the electronic devices are improved. In addition, each electronic device further supports invoking of a remote voice capability, for example, obtaining a service response of a target control from the cloud server, to avoid re-development of the newly added control on each electronic device. This reduces software development costs.

It should be noted that the virtual component set described in the foregoing embodiments is also referred to as a "component set". For example, the second virtual component set may be referred to as a "first component set", and the third virtual component set may be referred to as a "second component set". There is an association relationship between the first component set and the first interface type of the first application, and there is a specific association relationship between the second component set and the first interface type of the second application. The first interface type includes but is not limited to video playing, music playing, picture/photo preview, text browsing, and the like. In addition, the first application and the second application may be applications (APPs) such as the video playing application, the voice playing application, and the picture/photo preview application.

The following describes an apparatus embodiment corresponding to the foregoing method embodiments.

Figure 9:
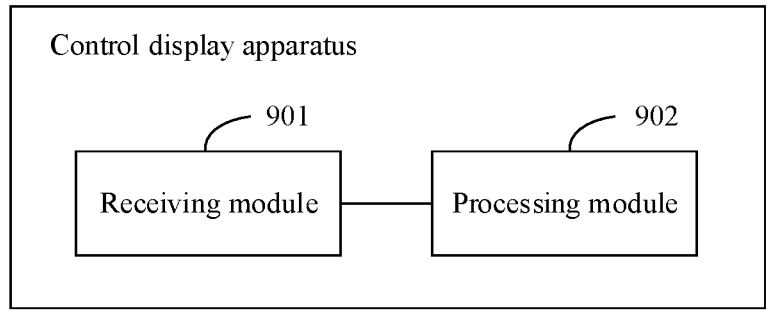
FIG. 9 is a schematic diagram of a structure of a control display apparatus according to an embodiment of this application.

FIG. 9 is a schematic diagram of a structure of a control display apparatus according to an embodiment of this application. The apparatus may be an electronic device, or a component located in the electronic device, for example, a chip circuit. In addition, the apparatus may implement the control adding method in the foregoing embodiment.

Specifically, as shown in FIG. 9, the apparatus may include a receiving module 901 and a processing module 902. In addition, the apparatus may further include other units or modules such as a communications module and a storage unit. The communications module and the storage unit are not shown in FIG. 9. In addition, the apparatus further includes a display. The display is configured to display at least one control.

The receiving module 901 is configured to receive a wake-up word input by a user. The processing module 902 is configured to indicate, in response to the received wake-up word, the display to display a second interface of a first application, where the second interface includes a first control and a second control. The processing module 902 is further configured to: receive a switching operation of the user, and indicate the display to display a first interface of a second application, where the first interface of the second application includes the first control. The receiving module 901 is further configured to receive the wake-up word input again by the user. The processing module 902 is further configured to indicate, in response to the received wake-up word, the display to display a second interface of the second application, where the second interface of the second application includes the first control and a third control.

Optionally, in a specific implementation of this embodiment, the processing module 902 is further configured to: obtain a first component set based on a first interface type of the first application before the second interface of the first application is displayed. The first component set includes the second control.

Optionally, in another specific implementation of this embodiment, the processing module 902 is further configured to: obtain a second component set based on a first interface type of the second application before the second interface of the second application is displayed. The second component set includes the third control.

Optionally, the processing module 902 may obtain the first component set and the second component set from the storage unit.

Optionally, the second interface of the first application further includes prompt information corresponding to the second control.

Optionally, in still another specific implementation of this embodiment, the processing module 902 is further configured to indicate, in response to a first voice instruction, the display to display a third interface of the first application, where the third interface includes a service response that is output after an operation corresponding to the first voice instruction is performed.

Optionally, in yet another specific implementation of this embodiment, the processing module 902 is further configured to: enable the second control, perform the operation corresponding to the first voice instruction, and indicate to display the service response in the third interface of the first application; or receive, by using the communications module, the service response sent by a server, and indicate to display the service response in the third interface of the first application. The communications module has a data receiving and sending function.

Optionally, in still yet another specific implementation of this embodiment, the processing module 902 is further configured to: indicate to display a control icon of the second control in the second interface of the first application; or indicate to display a control icon of the second interface and the prompt information of the second control in the second interface of the first application.

Optionally, the second interface of the first application further includes a control icon of a fourth control. The fourth control is used to perform an operation corresponding to a second voice instruction. The control icon of the second control is in a first color, the control icon of the fourth control is in a second color, and the first color is different from the second color.

The processing module 902 is further configured to: in response to the first voice instruction, enable the second control and perform the operation corresponding to the first voice instruction; and in response to the second voice instruction, send an indication signal to the server by using the communications module. The indication signal is used to indicate the server to perform the operation corresponding to the second voice instruction.

In addition, the processing module 902 is further configured to indicate the display to display a first service response or a second service response. The first service response is a service response that is output after the processing module 902 performs the operation corresponding to the first voice instruction. The second service response is a service response received from the server, and the service response is output after the server executes the second voice instruction.

Optionally, in this embodiment, the receiving module 901 is configured to receive the wake-up word input by the user. The processing module 902 is configured to indicate, in response to the received wake-up word, the display to display a first interface of the first application, where the first interface includes the first control.

The receiving module 901 is further configured to receive the first voice instruction input by the user. The processing module 902 is further configured to: in response to the received first voice instruction, indicate the display to display the second interface of the first application, where the second interface includes the first control and the second control, and the second control is used to perform the operation corresponding to the first voice instruction.

Optionally, in a specific implementation of this embodiment, the processing module 902 is further configured to: before indicating the display to display the second interface of the first application, obtain text content corresponding to the first voice instruction, where the text content corresponds to the second control; and when the first interface of the first application does not include the second control, obtain the second control.

Optionally, in another specific implementation of this embodiment, the processing module 902 is further configured to obtain the second control based on an SDK table, where the SDK table includes the text content and the second control.

Optionally, in still another specific implementation of this embodiment, the receiving module 901 is further configured to receive again the first voice instruction input by the user. The processing module 902 is further configured to indicate, in response to the first voice instruction, the display to display the third interface of the first application, where the third interface includes the service response that is output after the operation corresponding to the first voice instruction is performed.

Figure 10:
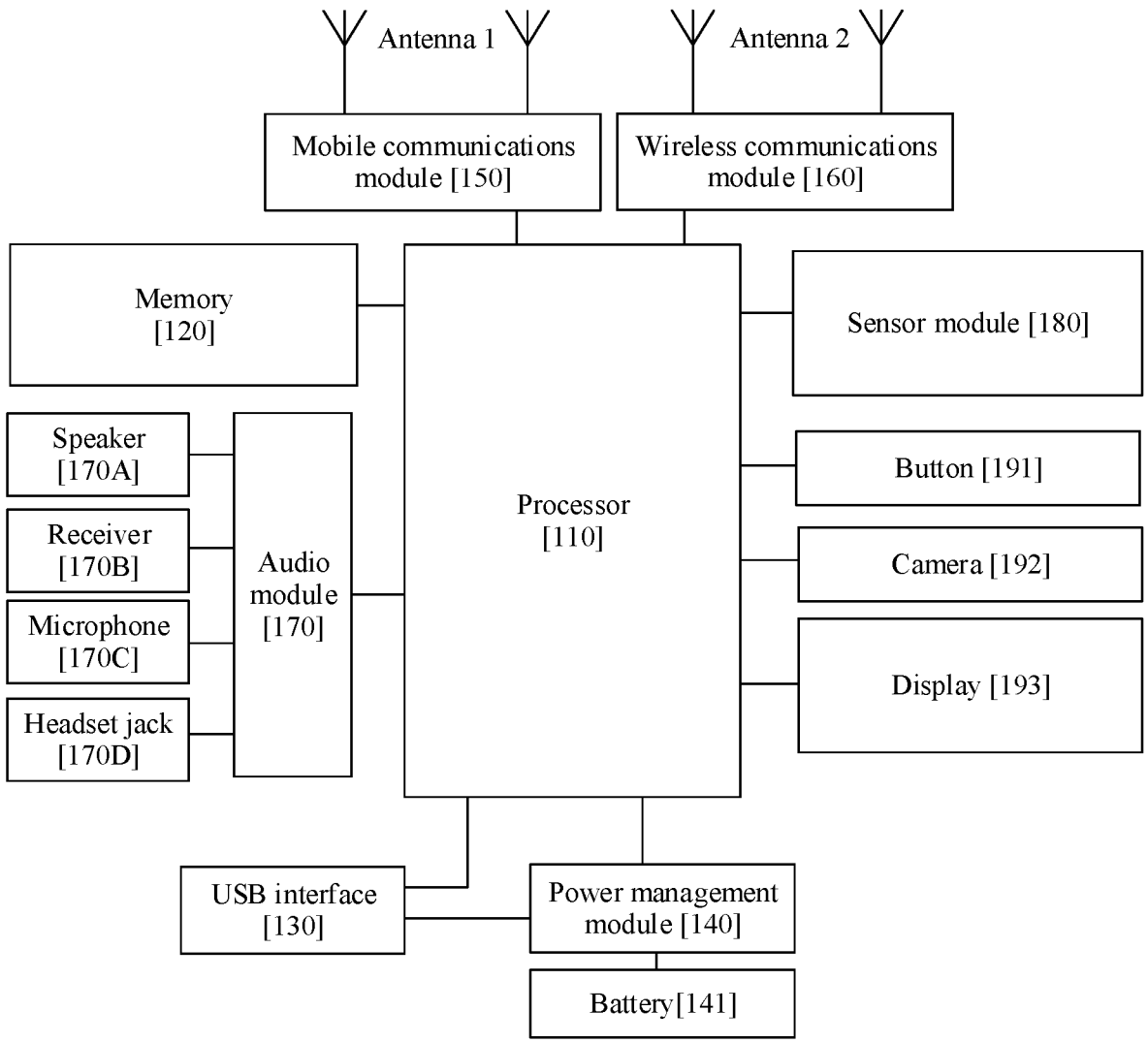
FIG. 10 is a schematic diagram of a structure of an electronic device according to an embodiment of this application.

In addition, in a hardware implementation, an embodiment further provides an electronic device. FIG. 10 is a schematic diagram of a structure of an electronic device. The device includes a processor 110 and a memory 120. In addition, the device further includes: a USB interface 130, a power management module 140, a battery 141, an antenna 1, an antenna 2, a mobile communications module 150, a wireless communications module 160, an audio module 170, a loudspeaker 170A, a receiver 170B, a microphone 170C, a headset jack 170D, a sensor module 180, a button 191, a camera 192, a display 193, and the like.

It may be understood that, the structure shown in this embodiment does not constitute a specific limitation to the electronic device. In some other embodiments of this application, the electronic device may include more or fewer components than those shown in the figure, or combine some components, or split some components, or have a different component arrangement. The components shown in the figure may be implemented by hardware, software, or a combination of software and hardware.

The processor 110 may be formed by an integrated circuit (IC), for example, may be formed by a single packaged IC, or may be formed by connecting a plurality of connected packaged ICs that have a same function or different functions. For example, the processor 110 may include a central processing unit (CPU), a digital signal processor (DSP), or the like.

In addition, the processor 110 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a universal serial bus (USB) interface, and/or the like.

The memory 120 is configured to store and exchange various types of data or software, including an SDK table, a first voice instruction, a second voice instruction, text content corresponding to the first voice instruction, text content corresponding to the second voice instruction, a first virtual component set, a second virtual component set, a control icon, and the like, and is further configured to store files such as audio, a video, and a picture/photo. In addition, the memory 120 may store computer program instructions or code.

Specifically, the memory 120 may include a volatile memory, for example, a random access memory (RAM), and may further include a non-volatile memory, for example, a read-only memory (ROM), a flash memory, a hard disk drive (HDD), or a solid-state drive (SSD). The memory 120 may further include a combination of the foregoing types of memories.

The display 193 may be configured to display control icons and prompt information corresponding to a first control, a second control, and a third control, and display different application interfaces, for example, a first interface and a second interface of a first application, and a first interface and a second interface of a second application. In addition, the display 193 may further display a picture, a photo, text information, play a media stream such as a video or audio, and the like.

Specifically, the display 193 may include a display panel and a touch panel. The display panel may be configured in a form of a liquid crystal display (LCD), an organic light-emitting diode (OLED), or the like. The touch panel is also referred to as a touchscreen, a touch-sensitive screen, or the like. In some embodiments, the electronic device 100 may include one or N displays 193, where N is a positive integer greater than 1.

The audio module 170, a loudspeaker 170A, a receiver 170B, and a microphone 170C may implement voice interaction between a user and the electronic device. The audio module 170 includes an audio circuit, which may transmit, to the loudspeaker 170A, a signal converted from received audio data. The loudspeaker 170A converts the signal into a sound signal for outputting.

The microphone 170C is configured to: receive a sound signal input by the user, for example, a wake-up word, the first voice instruction, or the second voice instruction, convert the received sound signal into an electrical signal, and then transmit the electrical signal to the audio module 170. After receiving the electrical signal, the audio module 170 converts the electrical signal into audio data, and then outputs the audio data to the processor 110 for further processing, to obtain text content corresponding to the voice instruction.

The sensor module 180 may include at least one sensor, such as a pressure sensor, a gyroscope sensor, a barometric pressure sensor, a magnetic sensor, an acceleration sensor, a distance sensor, a touch sensor, or a fingerprint sensor.

The button 191 includes a power button, a volume button, and the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, may be configured to transmit data between the electronic device and a peripheral device, or may be configured to connect to a headset and play audio through the headset. The interface may be further configured to connect to another electronic device such as a virtual reality device.

The power management module 140 is configured to connect the battery 141 to the processor 110. The power management module 140 supplies power to the processor 110, the memory 120, the display 193, the camera 192, the mobile communications module 150, the wireless communications module 160, and the like. In some embodiments, the power management module 140 may alternatively be disposed in the processor 110.

A wireless communication function of the electronic device may be implemented through the antenna 1, the antenna 2, the mobile communications module 150, the wireless communications module 160, a modem processor, a baseband processor (or a baseband chip), and the like. The antenna 1 and the antenna 2 are configured to transmit and receive an electromagnetic wave signal. Each antenna of the electronic device may be configured to cover one or more communication frequency bands. Different antennas may be further multiplexed, to improve antenna utilization.

The mobile communications module 150 may provide a solution that includes wireless communication such as 2G/3G/4G/5G and that is applied to the electronic device. The mobile communications module 150 may include at least one filter, a switch, a power amplifier, a low noise amplifier (LNA), and the like. In some embodiments, at least some function modules of the mobile communications module 150 may be disposed in the processor 110. The wireless communications module 160 may provide a wireless communication solution that is applied to the electronic device, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communications module 160 may be one or more components integrating at least one communications processor module. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), and a Beidou navigation satellite system (BDS).

In this embodiment, when the electronic device is used as a control display apparatus, the method shown in FIG. 2 or FIG. 6 may be implemented. In addition, in the apparatus shown in FIG. 9, a function of the receiving module 901 may be implemented by the audio module 170 or the microphone 170C in the audio module 170, a function of the processing module 902 may be implemented by components such as the processor 110 and the display 193, and a function of the storage unit may be implemented by the memory 120.

In addition, an embodiment of this application further provides a system. The system includes at least one electronic device, and may further include a server, for example, a cloud server, configured to implement the control display methods in the foregoing embodiments. A structure of the server may be the same as or different from a structure of the electronic device shown in FIG. 10. This is not limited in this embodiment.

In addition, an embodiment of this application further provides a computer storage medium. The computer storage medium may store a program. When the program is executed, some or all steps of the control adding method provided in this application may be performed. The storage medium includes but is not limited to a magnetic disk, an optical disc, a ROM, a RAM, or the like.

All or some of the foregoing embodiments may be implemented by using software, hardware, firmware, or any combination thereof. When software is used to implement embodiments, all or a part of the embodiments may be implemented in a form of a computer program product.

The computer program product includes one or more computer instructions. When the computer program instructions are loaded and executed on a computer, all or some of the method procedures or functions are generated according to the embodiments of this application. The computer may be a general-purpose computer, a dedicated computer, a computer network, or other programmable apparatuses. The computer instructions may be stored in a computer-readable storage medium, or transmitted from one computer-readable storage medium to another computer-readable storage medium.

In addition, in the descriptions of this application, "a plurality of" means two or more than two unless otherwise specified. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The foregoing implementations of this application are not intended to limit the protection scope of this application.

What is claimed is:

1. A control display method, applied to an electronic device, wherein the electronic device comprises a display, a first interface of a first application is displayed on the display, the first interface comprises a first control, and the method comprises:
   receiving a wake-up word input by a user;
   displaying a second interface of the first application in response to the received wake-up word, wherein the second interface comprises the first control and a second control;
      wherein the displaying the second interface of the first application comprises: displaying a control icon of the second control in the second interface of the first application;
      wherein the second interface of the first application further comprises a control icon of a fourth control;
      wherein the control icon of the second control is in a first color, the control icon of the fourth control is in a second color, and the first color is different from the second color:
   receiving a switching operation of the user, and displaying a first interface of a second application on the display, wherein the first interface of the second application comprises the first control;
   receiving the wake-up word input again by the user; and
   displaying a second interface of the second application in response to the received wake-up word, wherein the second interface of the second application comprises the first control and a third control.

2. The method according to claim 1, wherein before displaying the second interface of the first application in response to the received wake-up word, the method further comprises:
   obtaining a first component set based on a first interface type of the first application, wherein the first component set comprises the second control.

3. The method according to claim 1, wherein before displaying the second interface of the second application in response to the received wake-up word, the method further comprises:
   obtaining a second component set based on a first interface type of the second application, wherein the second component set comprises the third control.

4. The method according to claim 1, wherein the second interface of the first application further comprises:
   prompt information corresponding to the second control.

5. The method according to claim 1, further comprising:
   displaying a third interface of the first application in response to a first voice instruction, wherein the third interface comprises a service response that is output after an operation corresponding to the first voice instruction is performed.

6. The method according to claim 5, wherein the displaying the third interface of the first application in response to the first voice instruction comprises:

enabling the second control, performing the operation corresponding to the first voice instruction, and displaying the service response in the third interface of the first application; or
receiving, by the electronic device, the service response sent by a server, and displaying the service response in the third interface of the first application.

7. The method according to claim 1, wherein the displaying the second interface of the first application comprises:
   displaying a control icon of the second interface and prompt information of the second control in the second interface of the first application.

8. The method according to claim 7, wherein
   the fourth control is used to perform an operation corresponding to a second voice instruction;
   the method comprises:
   enabling, by the electronic device, the second control in response to the first voice instruction, and performing the operation corresponding to the first voice instruction; and
   sending, by the electronic device, an indication signal to a server in response to the second voice instruction, wherein the indication signal is used to indicate the server to perform the operation corresponding to the second voice instruction.

9. A control display method, applied to an electronic device, wherein the electronic device comprises a display, and the method comprises:
   receiving a wake-up word input by a user;
   displaying a first interface of an application on the display in response to the received wake-up word, wherein the first interface comprises a first control;
   receiving a first voice instruction input by the user;
   obtaining a second control in response to the received first voice instruction, including obtaining text content corresponding to the first voice instruction, wherein the text content corresponds to the second control; and based on the first interface of the application not comprising the second control, obtaining the second control;
   displaying a second interface of the application, wherein the second interface comprises the first control and the second control, and the second control is used to perform an operation corresponding to the first voice instruction.

10. The method according to claim 9, wherein the obtaining the second control comprises:
    obtaining the second control based on a software development kit (SDK) table, wherein the SDK table comprises the text content and the second control.

11. The method according to claim 9, comprising:
    receiving again the first voice instruction input by the user; and
    displaying a third interface of the application in response to the first voice instruction, wherein the third interface comprises a service response that is output after the operation corresponding to the first voice instruction is performed.

12. The method according to claim 11, wherein the displaying the third interface of the application in response to the first voice instruction comprises:
    enabling the second control, performing the operation corresponding to the first voice instruction, and displaying the service response in the third interface of the application; or receiving, by the electronic device, the service response sent by a server, and displaying the service response in the third interface of the application.

13. The method according to claim 9, wherein the displaying the second interface of the application comprises:
displaying a control icon of the second control in the second interface of the application; or
displaying a control icon of the second interface and prompt information of the second control in the second interface of the application.

14. The method according to claim 13, wherein the second interface of the application further comprises:
a control icon of a third control, and the third control is used to perform an operation corresponding to a second voice instruction;
the control icon of the second control is in a first color, the control icon of the third control is in a second color, and the first color is different from the second color; and the method comprises:
enabling, by the electronic device, the second control in response to the first voice instruction, and performing the operation corresponding to the first voice instruction; and
sending, by the electronic device, an indication signal to the server in response to the second voice instruction, wherein the indication signal is used to indicate the server to perform the operation corresponding to the second voice instruction.

15. An electronic device, comprising a processor and a memory, wherein
the memory is configured to store computer program instructions; and
the processor is configured to execute the instructions stored in the memory, to enable the electronic device to perform:
receiving a wake-up word input by a user;
displaying a first interface of an application on the display in response to the received wake-up word, wherein the first interface comprises a first control;
receiving a first voice instruction input by the user; and
obtaining a second control in response to the received first voice instruction, including obtaining text content corresponding to the first voice instruction, wherein the text content corresponds to the second control; and based on the first interface of the application not comprising the second control, obtaining the second control;
displaying a second interface of the application, wherein the second interface comprises the first control and the second control, and the second control is used to perform an operation corresponding to the first voice instruction.

16. The electronic device according to claim 15, wherein the obtaining the second control comprises:
obtaining the second control based on a software development kit (SDK) table, wherein the SDK table comprises the text content and the second control.

17. The electronic device according to claim 15, wherein the processor is further configured to execute the instructions stored in the memory, to enable the electronic device to perform:
receiving again the first voice instruction input by the user; and
displaying a third interface of the application in response to the first voice instruction, wherein the third interface comprises a service response that is output after the operation corresponding to the first voice instruction is performed.

18. The electronic device according to claim 17, wherein the displaying the third interface of the application in response to the first voice instruction comprises:
enabling the second control, performing the operation corresponding to the first voice instruction, and displaying the service response in the third interface of the application; or
receiving the service response sent by a server, and displaying the service response in the third interface of the application.

19. The electronic device according to claim 15, wherein the displaying the second interface of the application comprises:
displaying a control icon of the second control in the second interface of the application; or
displaying a control icon of the second interface and prompt information of the second control in the second interface of the application.

20. The electronic device according to claim 19, wherein the second interface of the application further comprises:
a control icon of a third control, and the third control is used to perform an operation corresponding to a second voice instruction;
the control icon of the second control is in a first color, the control icon of the third control is in a second color, and the first color is different from the second color; and the method comprises:
enabling, by the electronic device, the second control in response to the first voice instruction, and performing the operation corresponding to the first voice instruction; and
sending, by the electronic device, an indication signal to the server in response to the second voice instruction, wherein the indication signal is used to indicate the server to perform the operation corresponding to the second voice instruction.

* * * * *